(12) United States Patent
Sharma

(10) Patent No.: US 11,199,948 B2
(45) Date of Patent: *Dec. 14, 2021

(54) DISPLAYING A SEQUENCE AND FILES ASSOCIATED WITH THE SEQUENCE HAVING A MISSING FILE

(71) Applicant: EMC IP Holding Company LLC, Hopkinton, MA (US)

(72) Inventor: Bhavesh Sharma, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,041

(22) Filed: Jan. 31, 2020

(65) Prior Publication Data

US 2021/0240310 A1 Aug. 5, 2021

(51) Int. Cl.
*G06F 3/0482* (2013.01)
*G06F 16/16* (2019.01)

(52) U.S. Cl.
CPC .......... *G06F 3/0482* (2013.01); *G06F 16/168* (2019.01)

(58) Field of Classification Search
CPC .............................. G06F 3/0482; G06F 16/168
See application file for complete search history.

(56) References Cited

U.S. PATENT DOCUMENTS

| | | | | |
|---|---|---|---|---|
| 5,627,980 A * | 5/1997 | Schilit | ................... | G06F 3/0489 715/841 |
| 6,141,111 A * | 10/2000 | Kato | ................... | H04N 1/00968 358/1.15 |
| 6,292,273 B1 * | 9/2001 | Dow | ................... | H04N 1/00384 358/404 |
| 6,477,528 B1 | 11/2002 | Takayama | | |
| 6,687,902 B1 | 2/2004 | Curtis et al. | | |
| 6,704,465 B2 * | 3/2004 | Aoi | ................... | H04N 1/32101 348/36 |

(Continued)

OTHER PUBLICATIONS

Milkypostman et al. ("https://superuser.com/questions/236484/list-files-numbered-in-a-specific-range" with title "bash- list files numbered in a specific range—Super User"; pub date: Jan. 22, 2011; downloaded on Jun. 26, 2020).*

(Continued)

*Primary Examiner* — Jung-Mu T Chuang
(74) *Attorney, Agent, or Firm* — Amin, Turocy & Watson, LLP

(57) ABSTRACT

Various embodiments disclosed herein provide for displaying an alert and options when deleting a file associated with a sequence. A system is disclosed herein that can comprise receiving a first request to display, via a display device, content information, wherein the content information is associated with contents of a folder, determining that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values, and generating a display image according to a first format, wherein the display image comprises a sequence name image and a sequence value image.

20 Claims, 15 Drawing Sheets

(56) References Cited

U.S. PATENT DOCUMENTS

| | | | |
|---|---|---|---|
| 7,020,658 B1 | 3/2006 | Hill | |
| 7,181,553 B2* | 2/2007 | Pooni | G06F 13/423 |
| | | | 710/38 |
| 7,193,646 B1 | 3/2007 | Shioji | |
| 7,219,302 B1 | 5/2007 | O'Shaughnessy et al. | |
| 7,265,786 B2* | 9/2007 | Venturino | H04N 1/00461 |
| | | | 348/333.02 |
| 7,596,758 B2* | 9/2009 | Marion | G06F 9/451 |
| | | | 715/770 |
| 7,616,235 B2* | 11/2009 | Shibuya | G11B 27/031 |
| | | | 348/231.2 |
| 7,634,471 B2 | 12/2009 | Chen et al. | |
| 7,675,553 B2 | 3/2010 | Kumagai | |
| 7,724,289 B2* | 5/2010 | Kudo | G11B 27/034 |
| | | | 348/231.2 |
| 7,734,690 B2* | 6/2010 | Moromisato | G06Q 10/10 |
| | | | 709/204 |
| 7,779,358 B1 | 8/2010 | Gupta et al. | |
| 7,894,580 B2* | 2/2011 | Veen | H04M 3/537 |
| | | | 379/88.22 |
| 8,077,220 B2* | 12/2011 | Mukunashi | G11B 27/105 |
| | | | 348/231.2 |
| 8,185,839 B2 | 5/2012 | Jalon et al. | |
| 8,285,760 B1 | 10/2012 | Sina | |
| 8,417,724 B2* | 4/2013 | Masao | G06F 16/957 |
| | | | 707/791 |
| 8,471,925 B2 | 6/2013 | Chu | |
| 8,736,712 B2* | 5/2014 | Tomat | G06F 3/0481 |
| | | | 348/231.2 |
| 8,745,132 B2* | 6/2014 | Obradovich | H04N 21/4882 |
| | | | 709/204 |
| 8,788,962 B2* | 7/2014 | Waldeck | G06F 3/0482 |
| | | | 715/781 |
| 8,968,184 B2* | 3/2015 | Mitsunaga | A61B 1/00045 |
| | | | 600/109 |
| 9,098,370 B2 | 8/2015 | Macdonald | |
| 9,141,709 B1* | 9/2015 | Keslin | G06F 16/176 |
| 9,280,542 B2* | 3/2016 | Oules | G06F 16/40 |
| 9,298,742 B2* | 3/2016 | Matsushita | H04N 1/32128 |
| 9,301,143 B2* | 3/2016 | Mun | H04M 1/72403 |
| 9,729,485 B2* | 8/2017 | Mccann | G06F 3/04842 |
| 9,734,168 B1* | 8/2017 | Shin | G06F 16/51 |
| 9,760,652 B2* | 9/2017 | Lyle | G06F 16/81 |
| 9,773,010 B1 | 9/2017 | Ganesh et al. | |
| 9,836,472 B2* | 12/2017 | Cisler | G06F 16/168 |
| 10,209,859 B2* | 2/2019 | Yan | G06F 16/2246 |
| 10,567,570 B2* | 2/2020 | Rajab | H04L 67/38 |
| 10,762,060 B1 | 9/2020 | Faulkner et al. | |
| 2003/0169349 A1* | 9/2003 | Aoi | H04N 5/23238 |
| | | | 348/231.2 |
| 2003/0174217 A1 | 9/2003 | Kito et al. | |
| 2004/0186820 A1 | 9/2004 | Izume et al. | |
| 2004/0201691 A1* | 10/2004 | Bryant | H04N 1/00183 |
| | | | 348/207.1 |
| 2004/0201692 A1* | 10/2004 | Parulski | G06F 16/58 |
| | | | 348/207.1 |
| 2004/0201752 A1* | 10/2004 | Parulski | H04N 1/00188 |
| | | | 348/231.99 |
| 2004/0205286 A1* | 10/2004 | Bryant | H04N 5/772 |
| | | | 711/1 |
| 2004/0207660 A1* | 10/2004 | Marion | G06F 9/543 |
| | | | 715/764 |
| 2004/0225764 A1* | 11/2004 | Pooni | G06F 13/423 |
| | | | 710/38 |
| 2004/0267793 A1 | 12/2004 | Sato | |
| 2005/0086681 A1* | 4/2005 | Ebihara | G11B 27/105 |
| | | | 725/1 |
| 2005/0160109 A1* | 7/2005 | Sato | G06F 16/93 |
| 2005/0237391 A1* | 10/2005 | Shibuya | H04N 1/00161 |
| | | | 348/207.1 |
| 2005/0259164 A1* | 11/2005 | Kudo | G11B 27/034 |
| | | | 348/231.2 |
| 2006/0004792 A1* | 1/2006 | Lyle | G06F 16/81 |
| 2006/0087941 A1* | 4/2006 | Obradovich | G11B 27/034 |
| | | | 369/47.12 |
| 2006/0184890 A1* | 8/2006 | Altenhofen | G06F 3/0482 |
| | | | 715/764 |
| 2006/0259516 A1* | 11/2006 | Stakutis | G06F 16/166 |
| 2006/0288044 A1 | 12/2006 | Kashiwagi et al. | |
| 2007/0030360 A1* | 2/2007 | Udono | H04N 1/32128 |
| | | | 348/231.99 |
| 2007/0146493 A1* | 6/2007 | Mukunashi | H04N 1/00458 |
| | | | 348/220.1 |
| 2007/0166012 A1 | 7/2007 | Hirata | |
| 2007/0173233 A1* | 7/2007 | Vander Veen | H04M 3/53333 |
| | | | 455/413 |
| 2007/0255760 A1 | 11/2007 | Itoh et al. | |
| 2008/0282195 A1* | 11/2008 | Nakagawa | H04N 1/00453 |
| | | | 715/838 |
| 2008/0307343 A1 | 12/2008 | Robert et al. | |
| 2009/0037605 A1 | 2/2009 | Li | |
| 2009/0138808 A1* | 5/2009 | Moromisato | G06Q 10/10 |
| | | | 715/758 |
| 2009/0141315 A1* | 6/2009 | Hachiro | G06F 3/0483 |
| | | | 358/471 |
| 2009/0182776 A1 | 7/2009 | Nunomaki | |
| 2009/0216732 A1* | 8/2009 | Feng | G06F 16/248 |
| 2009/0278916 A1* | 11/2009 | Ito | H04N 21/4821 |
| | | | 348/51 |
| 2009/0307188 A1* | 12/2009 | Oldham | G06F 16/248 |
| 2010/0262595 A1* | 10/2010 | Park | G06F 16/156 |
| | | | 707/722 |
| 2010/0265545 A1* | 10/2010 | Ikeda | H04N 1/00347 |
| | | | 358/1.15 |
| 2010/0281084 A1* | 11/2010 | Gupta | G06F 16/54 |
| | | | 707/822 |
| 2011/0197129 A1* | 8/2011 | Hsu | G06F 9/451 |
| | | | 715/716 |
| 2011/0276864 A1* | 11/2011 | Oules | G06F 16/4393 |
| | | | 715/202 |
| 2011/0282853 A1* | 11/2011 | Masao | G06F 16/24 |
| | | | 707/705 |
| 2012/0017175 A1 | 6/2012 | Duquene et al. | |
| 2012/0154662 A1* | 6/2012 | Yang | H04N 5/225 |
| | | | 348/333.02 |
| 2013/0018946 A1 | 1/2013 | Brown et al. | |
| 2013/0033519 A1* | 2/2013 | Sato | G06F 16/54 |
| | | | 345/619 |
| 2013/0070120 A1* | 3/2013 | Tomat | G06F 3/0481 |
| | | | 348/231.2 |
| 2013/0132447 A1 | 5/2013 | Maeda | |
| 2013/0205251 A1 | 8/2013 | Cisler et al. | |
| 2013/0345502 A1* | 12/2013 | Mitsunaga | G11B 27/105 |
| | | | 600/103 |
| 2014/0195963 A1 | 7/2014 | Cheung et al. | |
| 2014/0208227 A1* | 7/2014 | Mccann | G06F 16/24575 |
| | | | 715/752 |
| 2014/0218545 A1* | 8/2014 | Matsushita | G06F 16/583 |
| | | | 348/207.1 |
| 2014/0304313 A1 | 10/2014 | Choi | |
| 2014/0359505 A1 | 12/2014 | Cisler et al. | |
| 2015/0046811 A1* | 2/2015 | Higashi | G06F 3/04842 |
| | | | 715/716 |
| 2015/0106761 A1* | 4/2015 | Moriya | G06F 3/04845 |
| | | | 715/784 |
| 2015/0133085 A1* | 5/2015 | Mun | H04L 63/083 |
| | | | 455/411 |
| 2015/0134913 A1 | 5/2015 | Huang et al. | |
| 2015/0254281 A1 | 9/2015 | Sauve et al. | |
| 2016/0140447 A1 | 5/2016 | Cohen et al. | |
| 2018/0039686 A1 | 2/2018 | Rodrigues et al. | |
| 2018/0349408 A1 | 12/2018 | Jewell et al. | |
| 2018/0349450 A1 | 12/2018 | Smyth et al. | |

(56) References Cited

U.S. PATENT DOCUMENTS

2019/0208052 A1* 7/2019 Rajab .................. H04L 67/42
2020/0145527 A1* 5/2020 Rajab .................. H04L 67/38

OTHER PUBLICATIONS

Bash Reference Manual (https://www.gnu.org/software/bash/manual/bash.pdf; pub date: May 2019).*
Meadowfox79 ("https://www.deviantart.com/meadowfox79/journal/Numbered-List-1-100-Copy-Paste-630410327"; pub date: Aug. 25, 2016; last downloaded Jun. 28, 2020).*
Non-Final Office Action received for U.S. App. No. 16/778,973 dated Jun. 26, 2020, 30 pages.
Non Final Office Action received for U.S Appl No. 16/779,122 dated Nov. 13, 2020, 36 Pages.
Final Office Action received for U.S. Appl. No. 16/778,973 dated Dec. 30, 2020, 32 pages.
Final Office Action received for U.S. Appl. No. 16/779,122 dated May 6, 2021, 36 Pages.
Non Final Office Action received for U.S. Appl. No. 16/778,973 dated Apr. 1, 2021, 37 pages.
Final Office Action received for U.S. Appl. No. 16/778,973 dated Sep. 1, 2021, 33 pages.

* cited by examiner

DISPLAYING A SEQUENCE AND FILES ASSOCIATED WITH THE SEQUENCE HAVING A MISSING FILE

TECHNICAL FIELD

The disclosed subject matter relates to managing data storage, and, more particularly, to displaying a sequence and files associated with the sequence having a missing file.

BACKGROUND

The large increase in amount of data generated by digital systems has created a new set of challenges for data storage environments. Conventional data storage techniques can store data in one or more files/folders. As an example, data can be stored in an ECS™ (formerly known as ELASTIC CLOUD STORAGE) system, hereinafter ECS™ system, such as is provided by DELL EMC. The example ECS™ system can comprise data storage devices, e.g., disks, etc., arranged in nodes, wherein nodes can be comprised in an ECS cluster. One use of data storage is by the media industry. The users (e.g., photographers or videographers) generate hundreds and thousands of files that are created as file sequences, wherein each file is part of sequence of files. For example, photos or videos taken at any given event, location or time follow a defined format for storing the files (e.g., IMG100.jpg, IMG101.jpg, IMG102.jpg, etc.). Depending on the rules/policies defined by the user or the storage system (e.g., ECS), these files may be stored in single location (e.g., a folder, a storage node, a disk) or multiple locations. A user conducting a photoshoot over several days may store files by days (e.g., store files from day 1 shoot in one file and store files from day 2 shoot in another) or by location (e.g., Los Angeles or New York). Also, in some instances, large files of a sequence of files may be stored in different locations due storage policies. Although the files are stored in different folders, the sequence remains the same. As such, the files of a sequence can utilize many folders and, in some cases, utilizing many levels of a file system.

During an editing phase or other post processing phase (e.g., after photos or videos are captured and stored in the data storage), the user can further manipulate the file sequence by deleting one or more files, and/or modifying location of one or more files. When a user deletes a file, either accidently or intentionally, the user may not know that there were other files closely related to the deleted file stored in different folders; some stored at two to three levels below the current folder. Also, because the files of file sequence are stored in multiple locations, it is difficult to determine how a selected file fits into the sequence. Also, if the user wishes to get information about a sequence or move a full or partial set of files associated with the sequence, the user would be required to open each folder and select the file(s) associated with the sequence in order to move the sequence of files. When the files of the sequence are stored in multiple locations, user would have to search the entire file system to find all the files. As such, some files may not get discovers.

The above-described background relating the sequence of files and how the files are stored is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
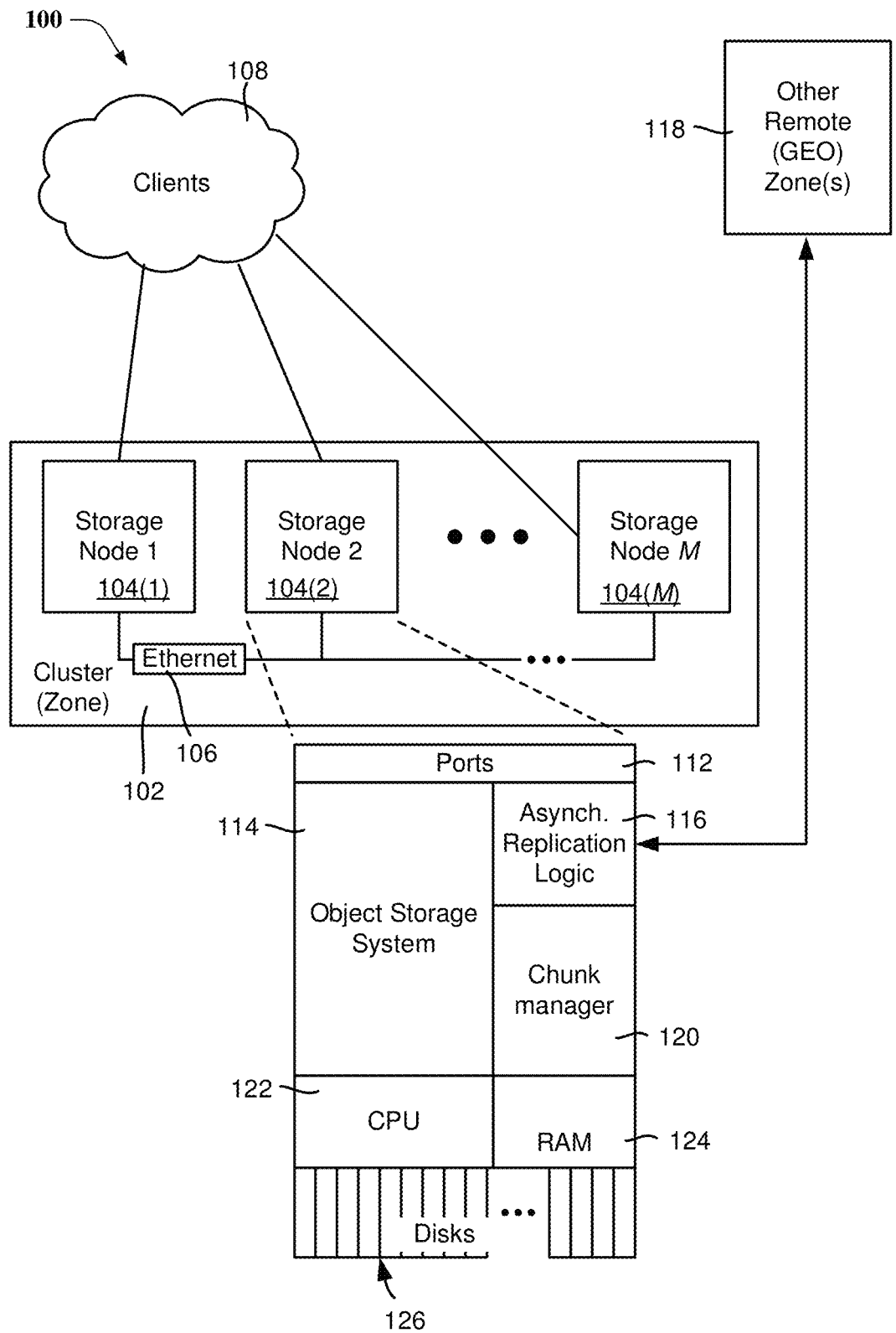
FIG. 1 illustrates a part of a cloud data storage system, in accordance with aspects of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate displaying a sequence and files associated with the sequence having a missing file. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

Described herein are systems, methods, articles of manufacture, and other embodiments or implementations that can facilitate displaying a sequence and files associated with the sequence having a missing file. Facilitating displaying a sequence and files associated with the sequence having a missing file can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

According to some embodiments, when a user is conducting post processing or wishes to manage storage space, the user can select a file to delete. The system can automatically determine whether the selected file is part of a sequence. For example, but not limited to, the system can evaluate the file name, a tag associated with file, an embedded tag that may not be visible, a time stamp, location stamp or the like. Once the selected file is identified as file associated with a sequence, the system generates a display (e.g., a predefined image) on a portion of the display device (e.g., display screen of a laptop, iPad, iPhone or the like). In one embodiment, the display comprises an alert (e.g., alerting the user by sound or visual display indicating that the file is associated with a sequence) and selectable options. In another embodiment, the display further comprises selectable options. The selectable option allows the user to check the current folder and/or parent folder(s) and/or subfolders(s) that may contain other files associated with the sequence. If the user elects to check additional folders, the system identifies all the files associated with the sequence and generates a display comprising the associated files. In some embodiments, the display comprises selectable options (e.g., delete all files associated with the sequence, delete files in the current folder associated with the sequence, delete only the selected file or select files from a list to delete). In some embodiments, the display further comprises options to move all the files located in various folders to another folder. Based on which option the user selects, the system can carry out the selected task. The advantage is that this system allows the user to delete all files associated with a sequence and located in multiple folders (e.g., parent and subfolders) with a simple move or selecting one option without having to file each file individually.

According to an embodiment, a system can comprise a processor and a memory that stores executable instructions that, when executed by the processor, facilitate performance of operations comprising receiving a request to delete a selected file stored in a first folder. The system can further facilitate determining that the selected file is part of a group of files associated with a sequence. The system can further facilitate displaying the group of files associated with the sequence using a first portion of a display device. The system can further facilitate generating a selectable image to display via a second portion of the display device, wherein the selectable image comprises at least a first selectable option to delete the group of files, a second selectable option to delete the selected file, and a third selectable option to select some files of the group of files to delete and in response to an option selected via input that results in a selection via the second portion, deleting at least one file of the group of files.

According to another embodiment, described herein is a method that can comprise receiving, by a device comprising a processor, a request to delete a selected file stored in a first folder. The method can further comprise determining, by the device, that the selected file is part of a group of files associated with a sequence. The method can further comprise in response to the determining that the selected file is part of the sequence, displaying, by the device, the group of files associated with the sequence via a display. The method can further comprise generating, by the device, a dialog box via the display, wherein the dialog box comprises a first option to delete the group of files, a second option to delete the selected file, and a third option to select some files of the group of files to delete and in response to an option selected via input that results in a selection via the display, deleting, by the device, one or more files.

According to yet another embodiment, a device can comprise a processor and a memory that stores executable instructions that, when executed by the processor, facilitate performance of operations comprising receiving a request to delete a selected file stored in a first folder. The device can further comprise determining whether the selected file is part of a group of files associated with a sequence. The device can further comprise in response to the determining indicating that the selected file is associated with the sequence, displaying the group of files associated with the sequence via a portion of a display. The device can further comprise generating a selectable portion on the display, wherein the selectable portion comprises at least a first option to delete the first group of files, a second option to delete the selected file, and a third option to select some files from the first group of files to delete, wherein the first group of files are displayed via the portion of the display and in response to an option selected via input that results in a selection via the selectable portion of the display, deleting at least one file of the group of files.

According to some embodiments, when a user, for example, but not limited to, hovers a pointer over a folder, taps on a folder using a stylus, pen, or finger, or selects a folder, to inquire addition details (e.g., does the folder contain any files related a sequence?), the system checks the content of the folder to determine if the folder contains one or more files associated with a sequence. If determined that one or more files associated with a sequence are stored in the selected folder, the system generates a display to show file(s) associated with the sequences. In some embodiments, if files associated with more than one sequence, the display comprises information about all the sequences and the files associated with the sequences. In some embodiments, for example, but not limited, the display can comprise a image indicating a sequence name, a sequence start value, a connector to show a range (e.g., " . . . " or the like), and a sequence end value (e.g., IMG_LA_[100, . . . , 106].jpg). In addition, the display can comprise folder names and hierarchy of the folder that contain the files associated with the sequence (see FIG. 4C below). In some embodiments, the user can select the image (e.g., IMG_LA_[100, . . . , 106].jpg) to delete the sequence or move the sequence to a single folder. The advantage is that user does not have search all the folders to find the files, the use can search any folder to find a sequence. Once the sequence is found, the user can perform additional tasks that impacts the entire sequence. Furthermore, the user does not need select hundreds or thousands of files, the user can select the image that shows the range.

According an embodiment, a system can comprise a processor and a memory that stores executable instructions that, when executed by the processor, facilitate performance of operations comprising receiving a request to generate content information, wherein the content information is associated with contents of a folder. The system can further facilitate determining that the folder comprises a first file associated with a first file sequence, wherein the first file sequence represents a first group of files assigned a first filename comprising a first sequence name portion and a first sequence value portion, wherein the first sequence name portion is assigned a first sequence name and the first sequence value portion is assigned a first sequence value selected from a group of first sequence values. The system can further facilitate rendering, via a display device, a display image comprising a first file sequence image and a first file sequence location image, wherein the first file sequence image comprises a first image representative of the first sequence name, a first sequence start value image, a first connector image, and a first sequence end value image.

According to another embodiment, described herein is a method that can comprise receiving, by a device comprising a processor, an indication to generate content information, wherein the content information is associated with contents of a folder. The method can further comprise determining, by the device, that the folder comprises a first file associated with a first file sequence, wherein the first file sequence represents a first group of files assigned a first filename comprising a first sequence name portion and a first sequence value portion, wherein the first sequence name portion is assigned a first sequence name and the first sequence value portion is assigned a first sequence value selected from a group of first sequence values. The method can further comprise generating, by the device, a display image comprising a first file sequence image and a first file sequence location image, wherein the first file sequence image comprises a first image representative of the first sequence name, a first sequence start value image, a first connector image, and a first sequence end value image.

According to yet another embodiment, a device can comprise a processor and a memory that stores executable instructions that, when executed by the processor, facilitate performance of operations comprising receiving a request to generate content information, wherein the content information is associated with contents of a folder. The device can further comprise determining that the folder comprises a first file associated with a first sequence, wherein the first sequence represents a first group of files assigned a first filename comprising a first sequence name portion and a first sequence value portion, wherein the first sequence name portion is assigned a first sequence name and the first sequence value portion is assigned a first sequence value selected from a group of first sequence values. The device can further comprise rendering, via a portion of a display device, a display image comprising a first sequence image and a first sequence location image, wherein the first sequence image comprises a first image representative of the first sequence name, a first sequence start value image, a first connector image, and a first sequence end value image.

According to some embodiments, when a user, for example, but not limited to, hovers a pointer over a folder, taps on a folder using a stylus, pen, or finger, or selects a folder to inquire addition details, the system determines that the content of the folder contains one or more files associated with a sequence. If determined that one or more files associated with a sequence are stored in the selected folder, the system generates a display to show file(s) associated with the sequences. For example, but not limited, the display can comprise a image indicating a sequence name, a sequence start value, a connector to show a range (e.g., " . . . " or the like), and a sequence end value (e.g., IMG_LA_[100, . . . , 106].jpg). In some embodiments, if one or more files is missing from the sequence, the connector (e.g., " . . . ") is displayed as a selectable option. If the user, for example, hovers a pointer over a folder, taps on a folder using a stylus, pen, or finger, or selects the connector, a second format is used to show files associated with the sequences. For example, the sequence information can be displayed using the sequence name and concatenated sequence numbers (e.g., IMG_LA_SHOOT_[101-102-104-105-106].jpg).

In addition, the display can comprise folder names and hierarchy of the folder that contain the files associated with the sequence. In some embodiments, the user can select the image (e.g., IMG_LA_[100, . . . , 106].jpg or IMG_LA_SHOOT_[101-102-104-105-106].jpg) to delete the sequence or move the sequence to a single folder. The advantage is that user does not have search all the folders to find the files, the use can search any folder to find a sequence. Once the sequence is found, the user can perform additional tasks that impacts the entire sequence. Furthermore, the use does not need select hundreds or thousands of files, the user can select the image that shows the range.

According an embodiment, a system can comprise a processor and a memory that stores executable instructions that, when executed by the processor, facilitate performance of operations comprising receiving a first request to display, via a display device, content information, wherein the content information is associated with contents of a folder. The system can further facilitate determining that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values. The system can further facilitate generating a display image according to a first format, wherein the display image comprises a sequence name image and a sequence value image.

According to another embodiment, described herein is a method that can comprise receiving, by a device comprising a processor, a first request to display, via a display device, content information, wherein the content information is associated with contents of a folder. The method can further comprise determining, by the device, that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values. The method can further comprise displaying, by the device, a display image according to a first format, wherein the display image comprises a sequence name image and a sequence value image.

According to yet another embodiment, a device can comprise a processor and a memory that stores executable instructions that, when executed by the processor, facilitate performance of operations comprising receiving a first request to display, via a display device, content information, wherein the content information is associated with contents of a folder. The device can further comprise identifying that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values. The device can further comprise rendering a display image via the display device according to a first format, wherein the display image comprises a sequence name image and a sequence value image.

These and other embodiments or implementations are described in more detail below with reference to the drawings. Repetitive description of like elements employed in the figures and other embodiments described herein is omitted for sake of brevity.

FIG. 1 illustrates a part of a cloud data storage system such as ECS™ comprising a zone (e.g., cluster) 102 of storage nodes 104(1)-104(M), in which each node is typically a server configured primarily to serve objects in response to client requests (e.g., received from clients 108). The nodes 104(1)-104(M) can be coupled to each other via a suitable data communications link comprising interfaces and protocols such as, but not limited to, Ethernet block 106.

Clients 108 can send data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), includes an instance of an object storage system 114 and data services. For a cluster that comprises a "GEO" zone of a geographically distributed storage system, at least one node, such as the node 104(2), includes or coupled to reference tracking asynchronous replication logic 116 that synchronizes the cluster/zone 102 with each other remote GEO zone 118. Note that ECS™ implements asynchronous low-level replication, that is, not object level replication. Typically, organizations protect against outages or information loss by backing-up (e.g., replicating) their data periodically. During backup, one or more duplicate or deduplicated copies of the primary data are created and written to a new disk or to a tape, for example within a different zone. The term "zone" as used herein can refer to one or more clusters that is/are independently operated and/or managed. Different zones can be deployed within the same location (e.g., within the same data center) and/or at different geographical locations (e.g., within different data centers).

In general, and in one or more implementations, e.g., ECS™, disk space is partitioned into a set of large blocks of fixed size called chunks; user data is stored in chunks. Chunks are shared, that is, one chunk may contain segments of multiple user objects; e.g., one chunk may contain mixed segments of some number of (e.g., three) user objects.

A chunk manager 120 can be utilized to manage the chunks and their protection (e.g., via erasure coding (EC)). Erasure coding was created as a forward error correction method for binary erasure channel. However, erasure coding can be used for data protection on data storages. During erasure coding (e.g., utilizing a k+m configuration), the chunk manager 120 can partition a piece of data (e.g., chunk) into k data fragments of equal size. During encoding, redundant m coding fragments are created so that the system can tolerate the loss of any m fragments. Typically, the chunk manager 120 can assign indices to the data fragments (and corresponding coding fragments). In an example, an index can be a numerical value (e.g., 1 to k) that is utilized for erasure coding. Moreover, the index of a data fragment can be utilized to determine a coefficient, within an erasure coding matrix, which is to be combined (e.g., multiplied) with the data fragment to generate a corresponding coding fragment for the chunk. For example, an index value can specify a row and/or column of the coefficient within the erasure coding matrix. As an example, the indices can be assigned based on a defined sequence, in a random order, based on a defined criterion (e.g., to increase probability of complementary data fragments), based on operator preferences, etc. The process of coding fragments creation is called encoding. The process of data fragments recovery using available data and coding fragments is called decoding.

In one example embodiment, GEO erasure coding can also be utilized, wherein if a distributed storage 100 is to tolerate the loss of any m zones/clusters/chunks, then GEO erasure coding can begin at each zone by replicating each new chunk to at least m remote zones. As a result, there are m backup copies of each chunk. Typically, there is one primary backup copy, which can be utilized for encoding. Encoding is performed by one zone for primary backup chunks and other zones replicate to it. Once a zone has k primary chunks replicated from different remote zones, the zone can perform encoding using the chunks replicated to it as data fragments. The chunk size is fixed, in ECS™, with padding or other data to complement, wherein the other data is added as needed. The result of encoding is m data portions of a chunk size. They are stored as chunks of a specific type called coding chunks. After encoding is complete, the zone can store one coding chunk locally and move other m−1 coding chunks to remote zones making sure all the k+m data and coding chunks are stored at different zones whenever possible. Afterwards, the primary backup chunks used for encoding and their peer backup chunks at other zones can be deleted.

In some embodiments, the chunk manager 120 can efficiently generate combined data protection sets during consolidating two or more erasure-coded data portions (e.g., normal/source chunks) that have a reduced sets of data fragments. As an example, chunk manager 120 can verify that the two or more erasure-coded data portions are complementary (e.g., do not have data fragments with the same index) and perform a summing operation to combine their corresponding coding fragments to generate a combined protection set. A CPU 122 and RAM 124 are shown for completeness; note that the RAM 124 can comprise at least some non-volatile RAM. The node includes storage devices such as disks 126, comprising hard disk drives and/or solid-state drives. It is noted that the storage devices can comprise volatile memory(s) or nonvolatile memory(s), or both volatile and nonvolatile memory(s). Examples of suitable types of volatile and non-volatile memory are described below with reference to FIG. 11. The memory (e.g., data stores, databases, tables, etc.) of the subject systems and methods is intended to comprise, without being limited to, these and any other suitable types of memory.

Figure 2:
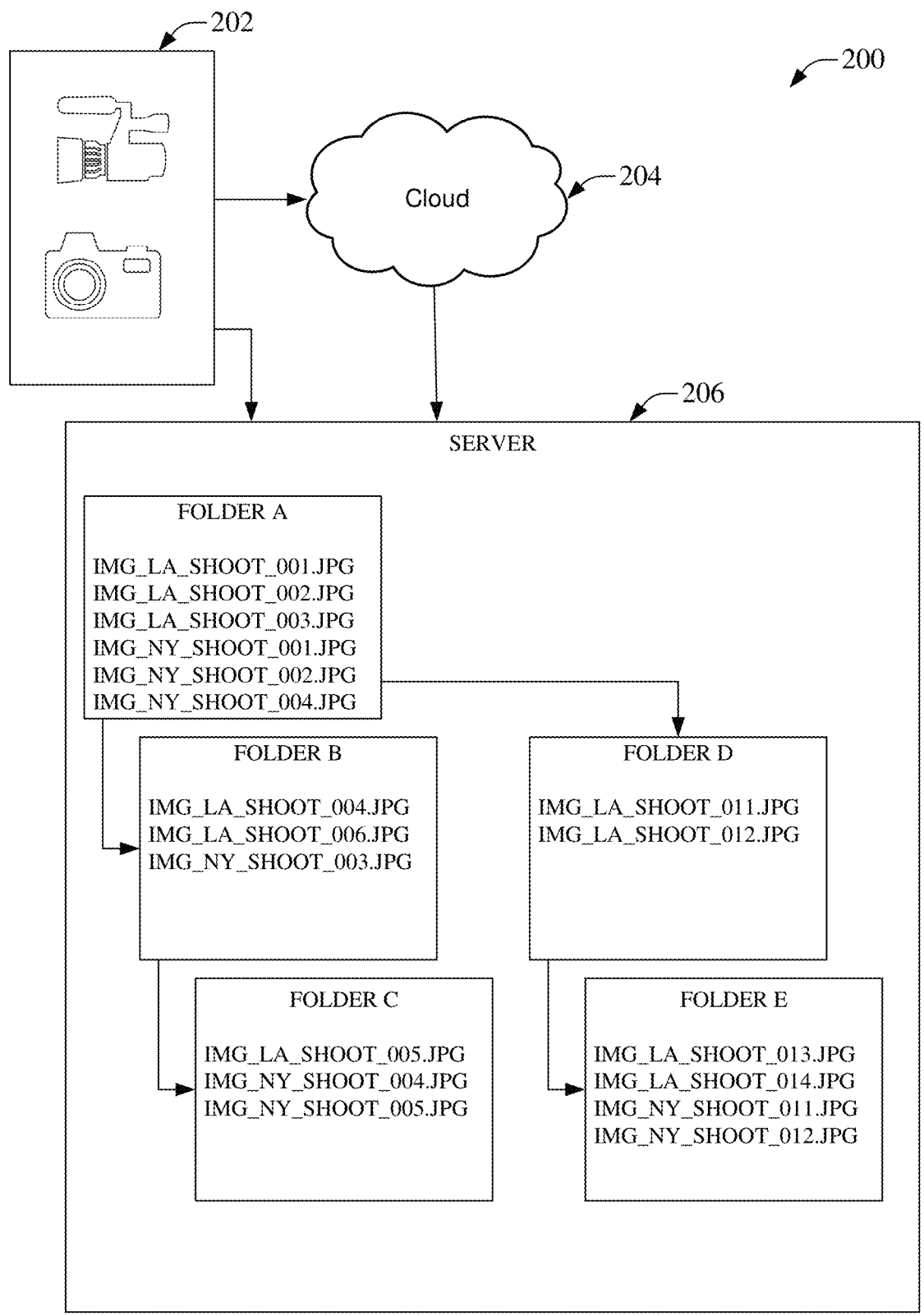
FIG. 2 illustrates an example of a system, which can facilitate storage of files using one or more folders, in accordance with aspects of the subject disclosure.

FIG. 2 illustrates an example of a system 200, which can facilitate storage of files using one or more folders, in accordance with aspects of the subject disclosure. In some embodiments, files are generated by an input device 202 (e.g., camera, video recorder, iPhone or the like). The files can be transferred from the input device 202 to the server 206 by use of cloud technology 204 (e.g., using over the air technology to wirelessly transfer files from the input device 202 to the server 206). The file can also be transferred and stored at server by direct connection or a wired connection. As an example, illustrated herein is the server 206 that comprise Folder A-E comprise files for first sequence (e.g., Los Angeles (LA) shoot) and second sequence (e.g., New York (N.Y.) shoot). For the LA shoot files are stored as follows: (FOLDER A contains IMG_LA_SHOOT_001.JPG, IMG_LA_SHOOT_002.JPG, IMG_LA_SHOOT_003.JPG, FOLDER B contains IMG_LA_SHOOT_004.JPG, IMG_LA_SHOOT_006.JPG, FOLDER C contains IMG_LA_SHOOT_005.JPG, FOLDER D contain IMG_LA_SHOOT_011.JPG, IMG_LA_SHOOT_012.JPG, FOLDER E contain IMG_LA_SHOOT_013.JPG, IMG_LA_SHOOT_014). As illustrated, Folder A is parent to Folder B and Folder D, Folder B is subfolder to Folder A and parent to Folder C. Folders A-C can be day 1 shoot in LA. Folder D is subfolder to Folder A and parent to Folder E. Folders D and E can be day 2 shoot. Although not illustrated, there may be multiple levels of folder below Folder C and E. The exemplary storage arrangement of the LA shoot files and NY shoot may be based storage policy or arranged by the user.

Figure 3:
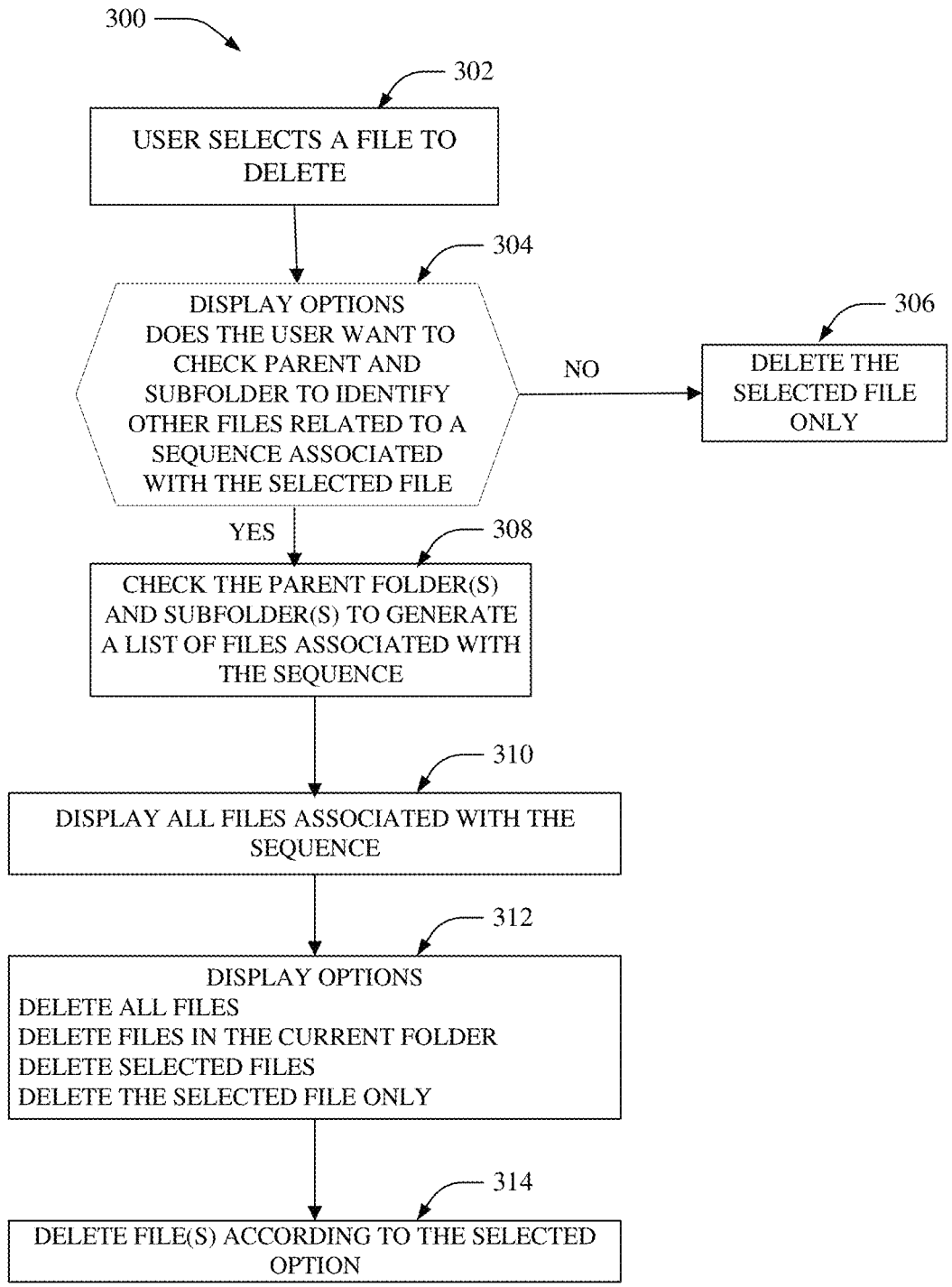
FIG. 3 illustrates a flow diagram of an example, non-limiting system that facilitates displaying an alert and options when deleting a file that is associated with a sequence of files in accordance with one or more embodiments described herein.

FIG. 3 illustrates a flow diagram of an example, non-limiting system 300 that facilitates displaying an alert and options when deleting a file that is associated with a sequence of files in accordance with one or more embodiments described herein. At 302, the user selects a file within one of the folders illustrated in FIG. 1 (described above) to delete. Selecting a file to delete causes the system 300 to generate a request for a processor (e.g. 1514 of FIG. 15) to delete the selected file (e.g., a request is received by the processor). At 304, an inquiry display is generated to ask if the user wants to check other folders (e.g., check parent or subfolder) to identify other files related to a sequence associated with the selected file. In some embodiments, the system 300 can identify if the selected file is associated with a sequence prior to displaying the injury and can provide an alert (e.g., sound, or visual alert). If user elects not to check other folders, then the selected file is deleted at 306. Otherwise, at 308, the system checks the parent folder(s) and subfolder(s) to generate a list of files associated with the sequence. At 310, the all the files associated with the sequence are identified and displayed on a display device. In some embodiments, the files associated with the sequence can be displayed in first format as shown in FIG. 4C (described below). At 312, the options are displayed for user to take further actions. For example, but not limited to, delete all files of the sequence, delete files in the current folder associated with the sequence, select files to delete or delete selected file only. At 314, file(s) are deleted based on the option selected by the user.

Figure 4A:
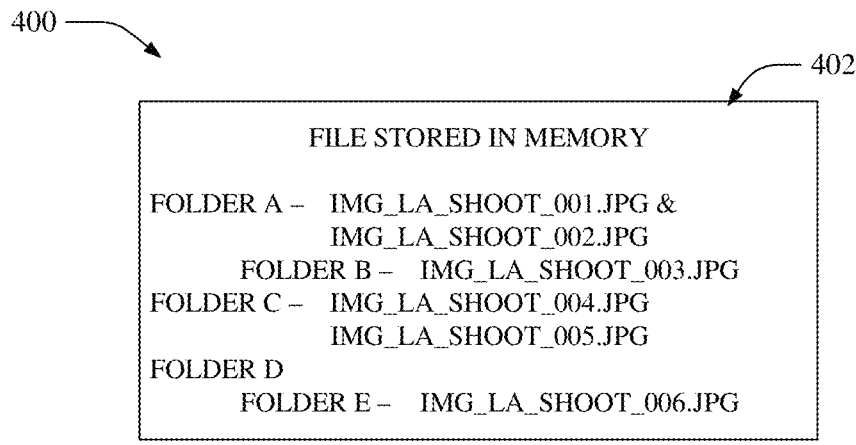
FIG. 4A illustrates an example of file storage structure stored in memory, in accordance with aspects of the subject disclosure.

FIG. 4A illustrates an example of file storage structure 400 stored in memory 402, in accordance with aspects of the subject disclosure. The memory 402, for example, comprise files associated with sequence (e.g., IMG_LA_SHOOT) and stored by folders. As illustrate, Folder A contains IMG_LA_SHOOT_001.jpg and IMG_LA_SHOOT_002.jpg. Folder B, subfolder to Folder A, contains IMG_LA_SHOOT_003.jpg. Folder C contains IMG_LA_SHOOT_004.jpg and IMG_LA_SHOOT_005.jpg. Folder E, a subfolder to Folder D, contains IMG_LA_SHOOT_006.jpg. The storage location of the files may be due to user organizing the files or based of storage policies.

Figure 4B:
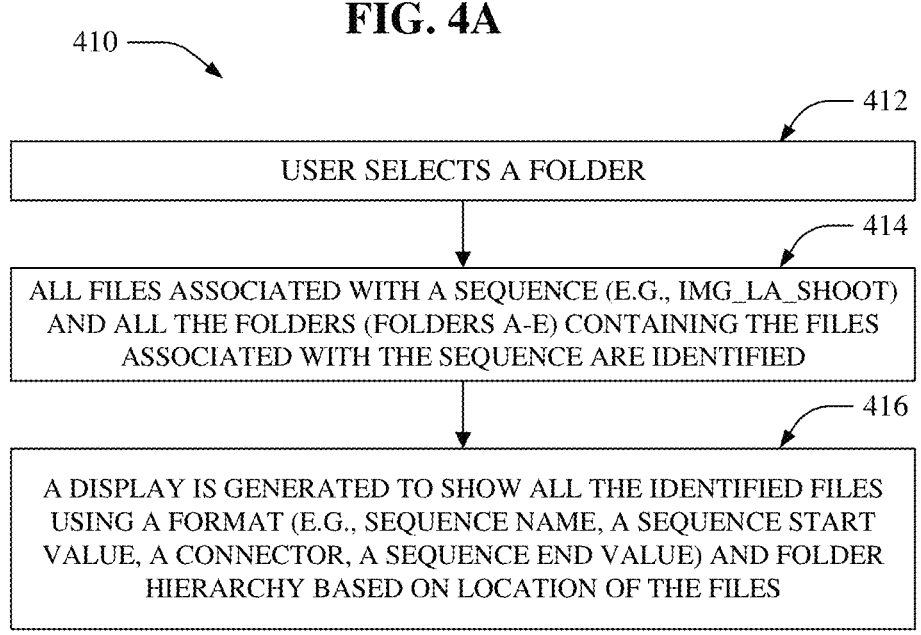
FIG. 4B illustrates a flow diagram of an example, non-limiting system that facilitates displaying a sequence and files associated with the sequence that are stored in multiple folders in accordance with one or more embodiments described herein.
Figure 4C:
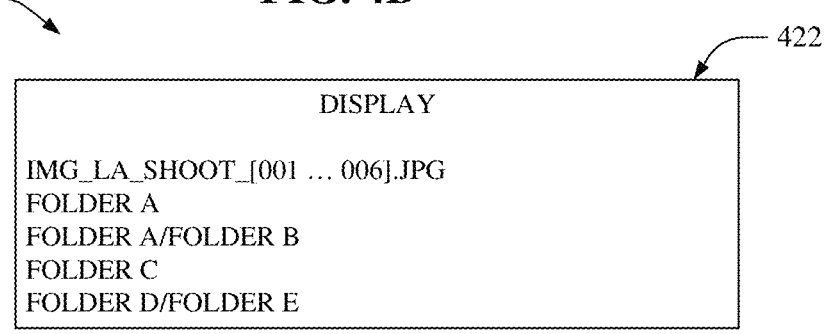
FIG. 4C illustrates an exemplary a display utilized by the system to facilitate displaying a sequence and files associated with the sequence that are stored in multiple folders, in accordance with aspects of the subject disclosure.

FIG. 4B illustrates a flow diagram of an example, non-limiting system 410 that facilitates displaying a sequence and files associated with the sequence that are stored in multiple folders in accordance with one or more embodiments described herein. At 412 the user selects a folder (e.g., any one of the Folder A-E) thereby causing the system to receive a request to generate content information, wherein the content information is associated with contents of a folder. The file can be selected, for example, but limited to, by hovering a pointer over the desired folder, taping on the folder or double clicking on the folder. At 414, if the folder contains at least on file associated with the sequence, all the files associated with a sequence (e.g., IMG_LA_SHOOT) and all the folders (e.g., Folders A-E) containing the files (e.g., IMG_LA_SHOOT_001 though 006) associated with the sequence are identified. Note that if the user selects Folder D, no display is generated because there are no files stored in Folder D related to the sequence. At 416, a display is generated to show all the identified files using a first format. The first format comprises a sequence name (e.g., IMG_LA_SHOOT), a sequence start value (e.g., 001 is lowest sequence value for the sequence or the first file in the sequence), a connector (e.g., " . . . " to show range), and a sequence end value (e.g., 006 the last file in the sequence). For example, the display can be an image of "IMG_LA_SHOOT_[001 . . . 006].jpg." Note that the sequence start value is associated with file have lowest sequence number of the sequence (e.g., example "002" is "001" file is deleted or no longer in the storage system). In addition, the folder hierarchy is displayed based on the storage location of the files. An example of the display is illustrated in FIG. 4B (described below).

FIG. 4C illustrates an exemplary a display utilized by the system 420 to facilitate displaying a sequence and files associated with the sequence that are stored in multiple folders, in accordance with aspects of the subject disclosure. The display 422 may occupy a portion of the display device (not shown). The display can be an image (e.g., "IMG_LA_SHOOT_[001 . . . 006].jpg"). The folder information can in form of a table. In some embodiment, an image of a table is displayed, wherein the layout of the table is generated as follows: Line 1 (FOLDER A), Line 2 (FOLDER A/FOLDER B), Line 3 (FOLDER C), Line 4 (FOLDER D/FOLDER E).

Figure 5A:
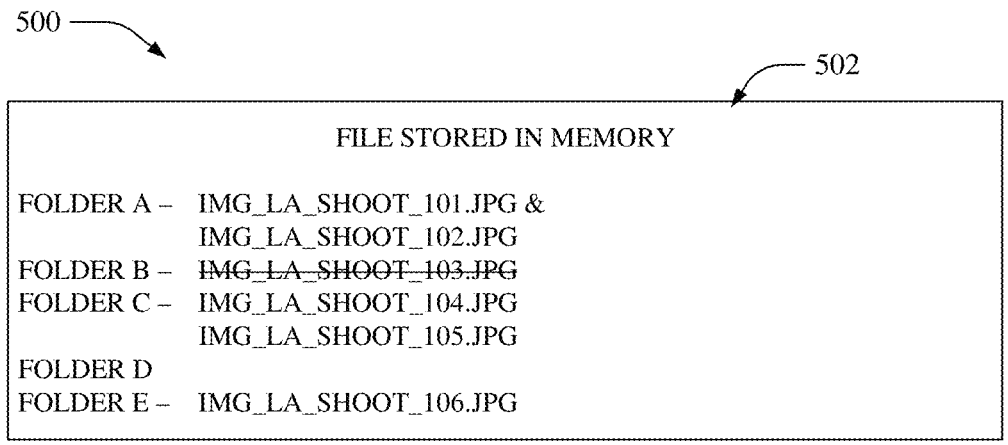
FIG. 5A illustrates an example of file storage structure stored in memory, in accordance with aspects of the subject disclosure.

FIG. 5A illustrates an example of file storage structure 500 stored in memory 502, in accordance with aspects of the subject disclosure. The memory 502, for example, comprise files associated with sequence (e.g., IMG_LA_SHOOT) and stored by folders. As illustrate, Folder A contains IMG_LA_SHOOT_001.jpg and IMG_LA_SHOOT_002.jpg. Folder C contains IMG_LA_SHOOT_004.jpg and IMG_LA_SHOOT_005.jpg. Folder E, a subfolder to Folder D, contains IMG_LA_SHOOT_006.jpg. A shown, IMG_LA_SHOOT_003.jpg is deleted from Folder B, thereby breaking the continuity of the sequence.

Figure 5B:
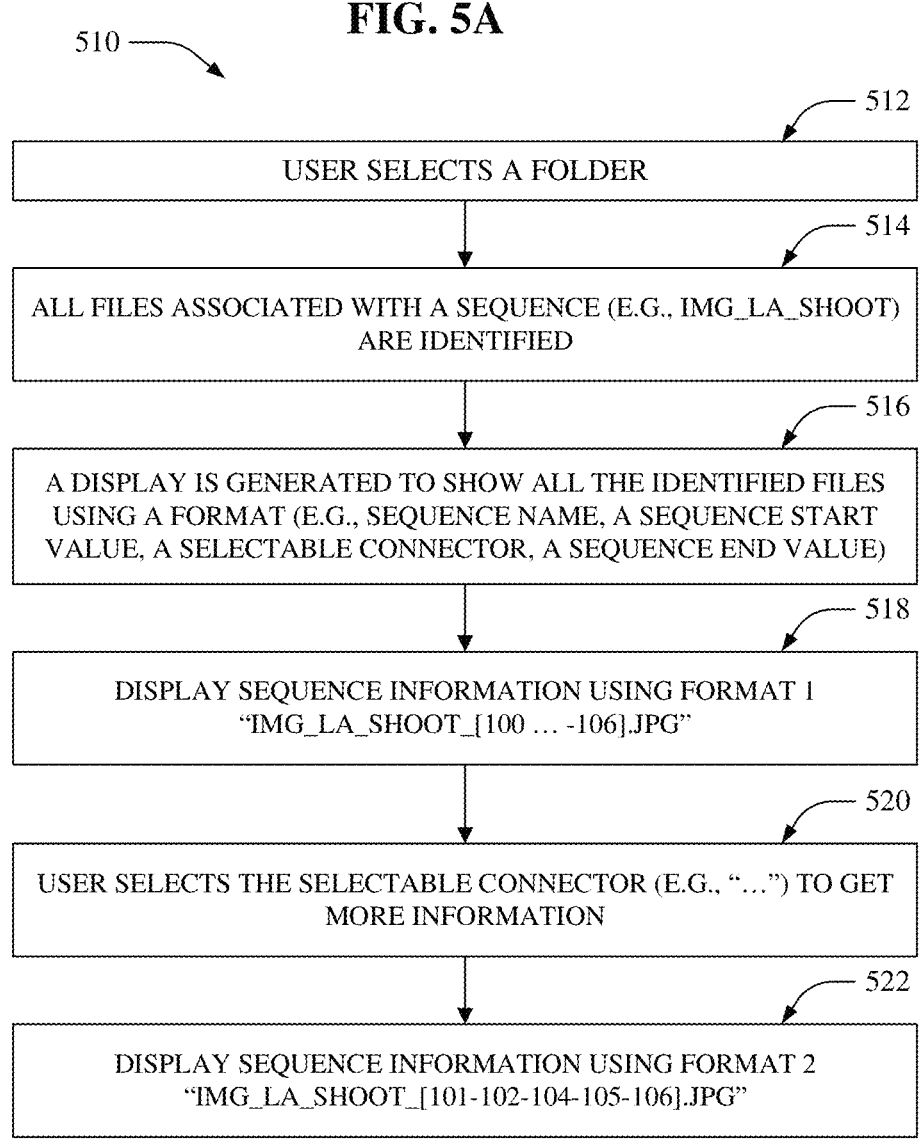
FIG. 5B illustrates a flow diagram of an example, non-limiting system 410 that facilitates displaying a sequence and files associated with the sequence having a missing file in accordance with one or more embodiments described herein.

FIG. 5B illustrates a flow diagram of an example, non-limiting system 410 that facilitates displaying a sequence and files associated with the sequence having a missing file in accordance with one or more embodiments described herein. At 512 the user selects a folder (e.g., any one of the Folder A-E) thereby causing the system to receive a request to generate content information, wherein the content information is associated with contents of a folder. The file can be selected, for example, but limited to, by hovering a pointer over the desired folder, taping on the folder or double clicking on the folder. At 514, if the folder contains at least on file associated with the sequence, all the files associated with a sequence (e.g., IMG_LA_SHOOT) and all the folders (e.g., Folders A-E) containing the files (e.g., IMG_LA_SHOOT_001 though 006) associated with the sequence are identified. Note that if the user selects Folder B for Folder D, no display is generated because there are no files stored in Folder B or D related to the sequence. At 516, a display is generated to show all the identified files using a first format. The first format comprises a sequence name (e.g., IMG_LA_SHOOT), a sequence start value (e.g., 001 is lowest sequence value for the sequence or the first file in the sequence), a connector (e.g., " . . . " to show range), and a sequence end value (e.g., 006 the last file in the sequence). For example, the display can be an image of "IMG_LA_SHOOT_[001 . . . 006].jpg." In some embodiments, the connector is a selectable connector to illustrate that the sequence is missing at one file from the sequence (e.g., IMG_LA_SHOOT_103.jpg is deleted). At 520, the user selects the selectable connector to get more information. The connector can be selected, for example, but limited to, by hovering a pointer over the connector, taping on the connector or double clicking on the connector. At 522, in response to user selecting the connector, sequence information is generated using a second format. In some embodiment, the sequence information presented according the second format as follows: (IMG_LA_SHOOT_[101-102-104-105-106].jpg), wherein the image of the sequence information is displayed on a display device. In addition, the folder hierarchy is displayed based on the storage location of the files. An example of the display is illustrated in FIG. 4B (described above).

Figure 6:
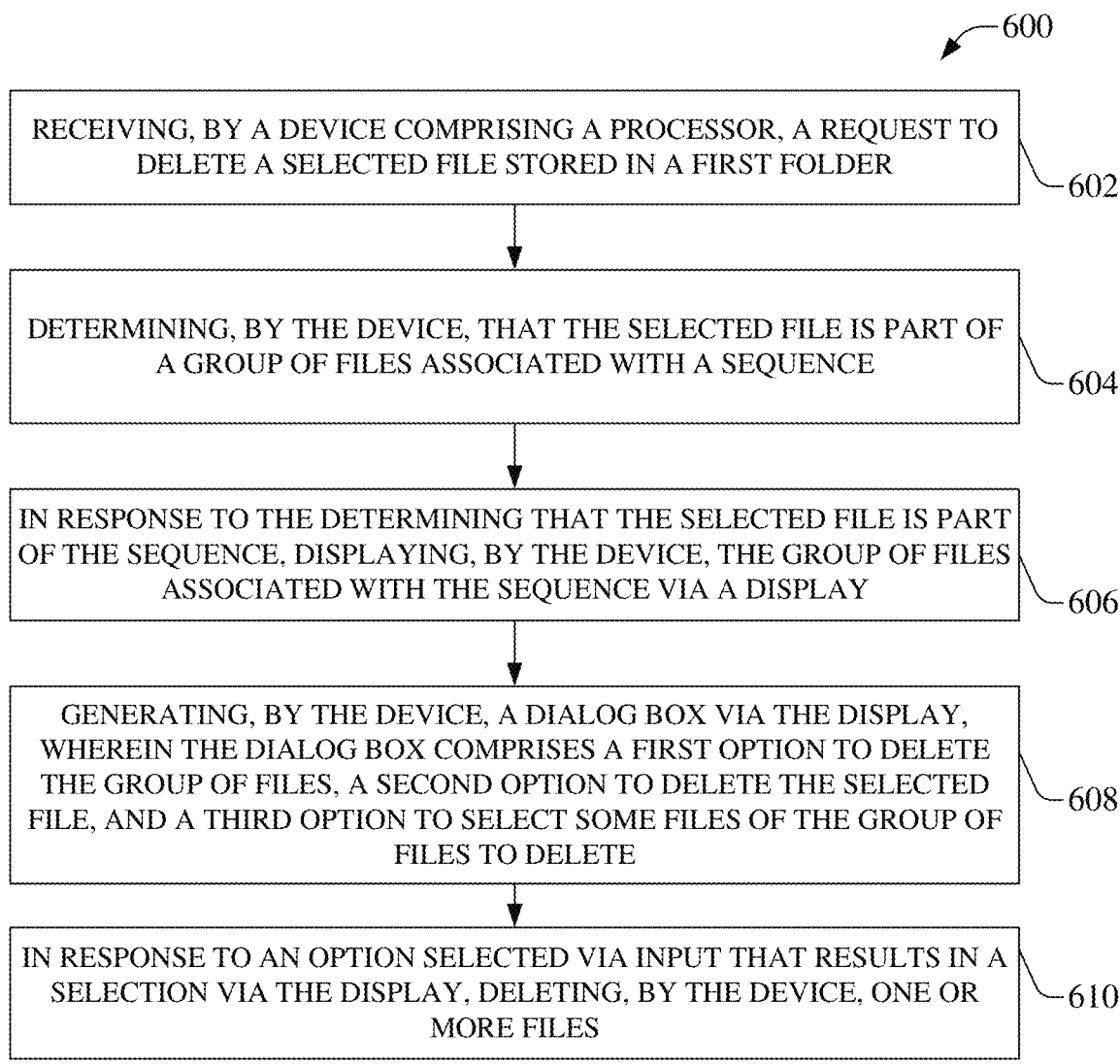
FIG. 6 depicts a diagram of an example, non-limiting computer implemented method that facilitates displaying an alert and options when deleting a file that is associated with a sequence of files.

FIG. 6 depicts a diagram of an example, non-limiting computer implemented method that facilitates displaying an alert and options when deleting a file that is associated with a sequence of files. Repetitive description of like elements employed in other embodiments described herein is omitted for sake of brevity. In some examples, flow diagram 600 can be implemented by operating environment 1500 described below. It can be appreciated that the operations of flow diagram 600 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts receiving, by a device comprising a processor, a request to delete a selected file stored in a first folder. Operation 604 depicts determining, by the device, that the selected file is part of a group of files associated with a sequence. Operation 606 depicts in response to the determining that the selected file is part of the sequence, displaying, by the device, the group of files associated with the sequence via a display. Operation 608 depicts generating, by the device, a dialog box via the display, wherein the dialog box comprises a first option to delete the group of files, a second option to delete the selected file, and a third option to select some files of the group of files to delete. Operation 610 depicts in response to an option selected via input that results in a selection via the display, deleting, by the device, one or more files.

Figure 7:
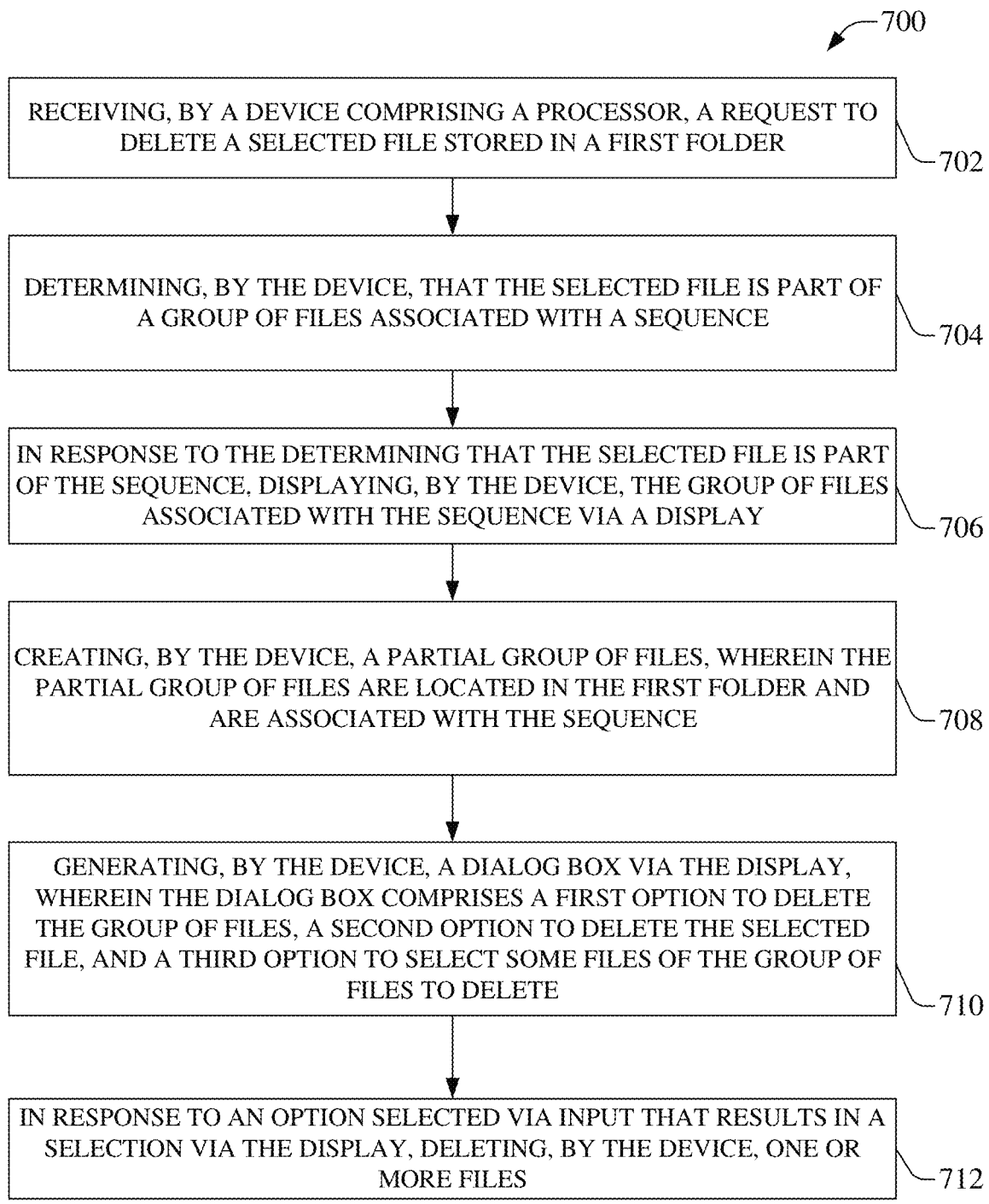
FIG. 7 depicts a diagram of an example, non-limiting computer implemented method that facilitates displaying an alert and options when deleting a file that is associated with a sequence of files.

FIG. 7 depicts a diagram of an example, non-limiting computer implemented method that facilitates displaying an alert and options when deleting a file that is associated with a sequence of files. Repetitive description of like elements employed in other embodiments described herein is omitted for sake of brevity. In some examples, flow diagram 700 can be implemented by operating environment 1500 described below. It can be appreciated that the operations of flow diagram 700 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts receiving, by a device comprising a processor, a request to delete a selected file stored in a first folder. Operation 704 depicts determining, by the device, that the selected file is part of a group of files associated with a sequence. Operation 706 depicts in response to the determining that the selected file is part of the sequence, displaying, by the device, the group of files associated with the sequence via a display. Operation 708 creating, by the device, a partial group of files, wherein the partial group of files are located in the first folder and are associated with the sequence. Operation 710 depicts generating, by the device, a dialog box via the display, wherein the dialog box comprises a first option to delete the group of files, a second option to delete the selected file, and a third option to select some files of the group of files to delete. Operation 712 depicts in response to an option selected via input that results in a selection via the display, deleting, by the device, one or more files.

Figure 8:
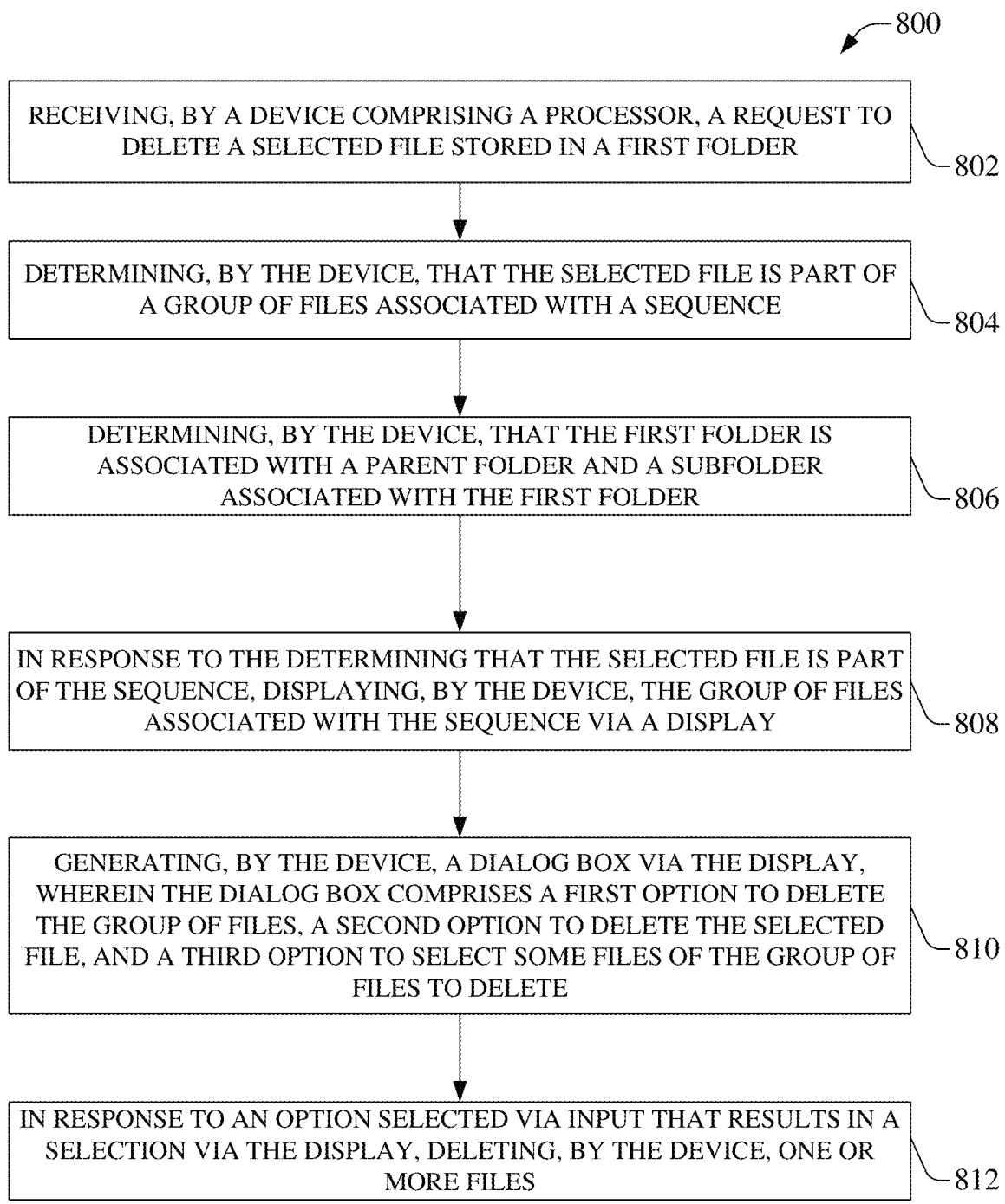
FIG. 8 depicts a diagram of an example, non-limiting computer implemented method that facilitates displaying an alert and options when deleting a file that is associated with a sequence of files.

FIG. 8 depicts a diagram of an example, non-limiting computer implemented method that facilitates displaying an alert and options when deleting a file that is associated with a sequence of files. Repetitive description of like elements employed in other embodiments described herein is omitted for sake of brevity. In some examples, flow diagram 800 can be implemented by operating environment 1500 described below. It can be appreciated that the operations of flow diagram 800 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts receiving, by a device comprising a processor, a request to delete a selected file stored in a first folder. Operation 804 depicts determining, by the device, that the selected file is part of a group of files associated with a sequence. Operation 806 depicts determining, by the device, that the first folder is associated with a parent folder and a subfolder associated with the first folder. Operation 808 depicts in response to the determining that the selected file is part of the sequence, displaying, by the device, the group of files associated with the sequence via a display. Operation 810 depicts generating, by the device, a dialog box via the display, wherein the dialog box comprises a first option to delete the group of files, a second option to delete the selected file, and a third option to select some files of the group of files to delete. Operation 812 depicts in response to an option selected via input that results in a selection via the display, deleting, by the device, one or more files.

Figure 9:
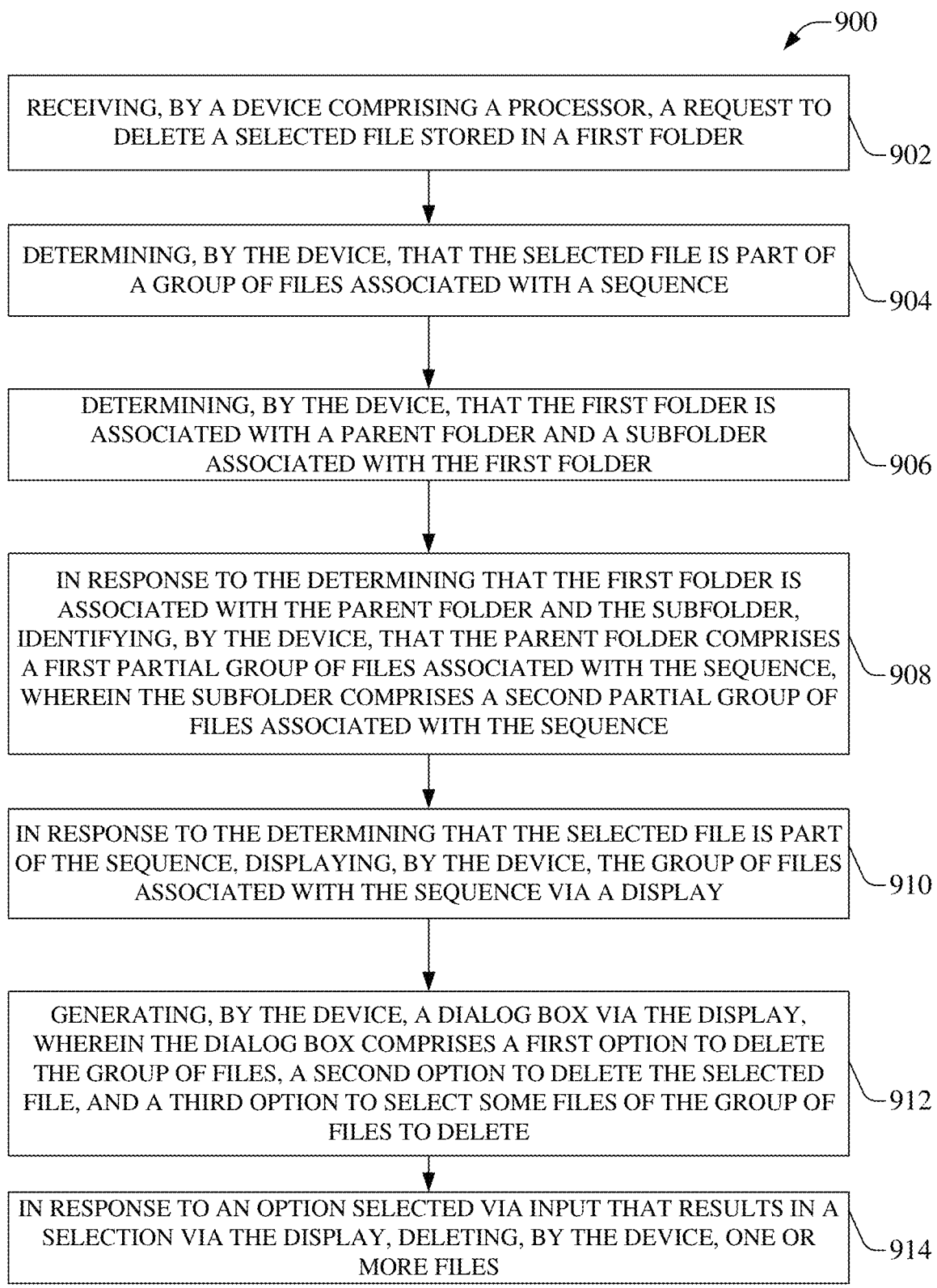
FIG. 9 depicts a diagram of an example, non-limiting computer implemented method that facilitates displaying an alert and options when deleting a file that is associated with a sequence of files.

FIG. 9 depicts a diagram of an example, non-limiting computer implemented method that facilitates displaying an alert and options when deleting a file that is associated with a sequence of files. Repetitive description of like elements employed in other embodiments described herein is omitted for sake of brevity. In some examples, flow diagram 900 can be implemented by operating environment 1500 described below. It can be appreciated that the operations of flow diagram 900 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts receiving, by a device comprising a processor, a request to delete a selected file stored in a first folder. Operation 904 depicts determining, by the device, that the selected file is part of a group of files associated with a sequence. Operation 906 depicts determining, by the device, that the first folder is associated with a parent folder and a subfolder associated with the first folder. Operation 908 depicts in response to the determining that the first folder is associated with the parent folder and the subfolder, identifying, by the device, that the parent folder comprises a first partial group of files associated with the sequence, wherein the subfolder comprises a second partial group of files associated with the sequence. Operation 910 depicts in response to the determining that the selected file is part of the sequence, displaying, by the device, the group of files associated with the sequence via a display. Operation 912 depicts generating, by the device, a dialog box via the display, wherein the dialog box comprises a first option to delete the group of files, a second option to delete the selected file, and a third option to select some files of the group of files to delete. Operation 914 depicts in response to an option selected via input that results in a selection via the display, deleting, by the device, one or more files.

Figure 10:
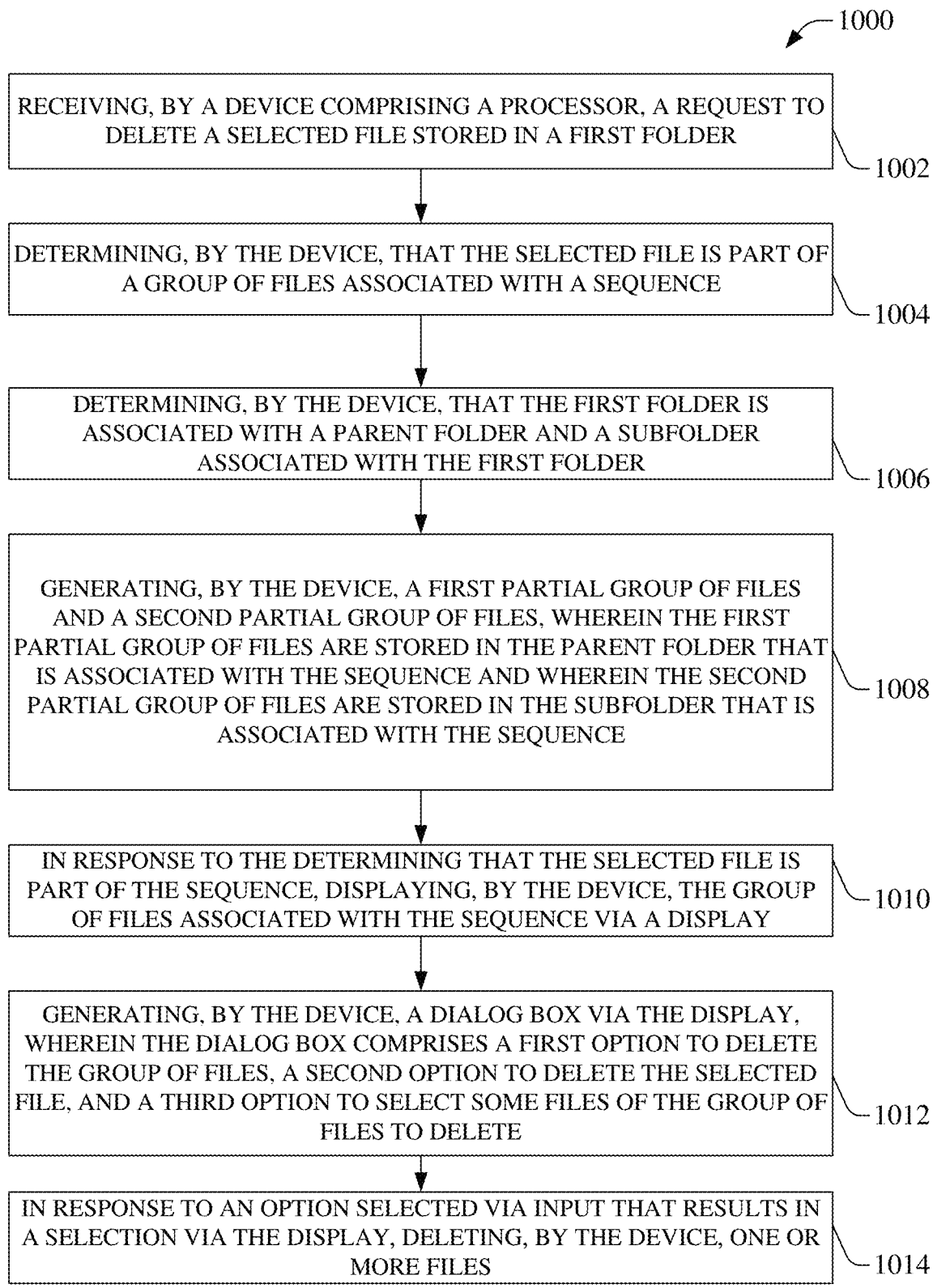
FIG. 10 depicts a diagram of an example, non-limiting computer implemented method that facilitates displaying an alert and options when deleting a file that is associated with a sequence of files.

FIG. 10 depicts a diagram of an example, non-limiting computer implemented method that facilitates displaying an alert and options when deleting a file that is associated with a sequence of files. Repetitive description of like elements employed in other embodiments described herein is omitted for sake of brevity. In some examples, flow diagram 1000 can be implemented by operating environment 1500 described below. It can be appreciated that the operations of flow diagram 1000 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts receiving, by a device comprising a processor, a request to delete a selected file stored in a first folder. Operation 1004 depicts determining, by the device, that the selected file is part of a group of files associated with a sequence. Operation 1006 depicts determining, by the device, that the first folder is associated with a parent folder and a subfolder associated with the first folder. Operation 1008 depicts generating, by the device, a first partial group of files and a second partial group of files, wherein the first partial group of files are stored in the parent folder that is associated with the sequence and wherein the second partial group of files are stored in the subfolder that is associated with the sequence. Operation 1010 depicts in response to the determining that the selected file is part of the sequence, displaying, by the device, the group of files associated with the sequence via a display. Operation 1012 depicts generating, by the device, a dialog box via the display, wherein the dialog box comprises a first option to delete the group of files, a second option to delete the selected file, and a third option to select some files of the group of files to delete. Operation 1014 depicts in response to an option selected via input that results in a selection via the display, deleting, by the device, one or more files.

Figure 11:
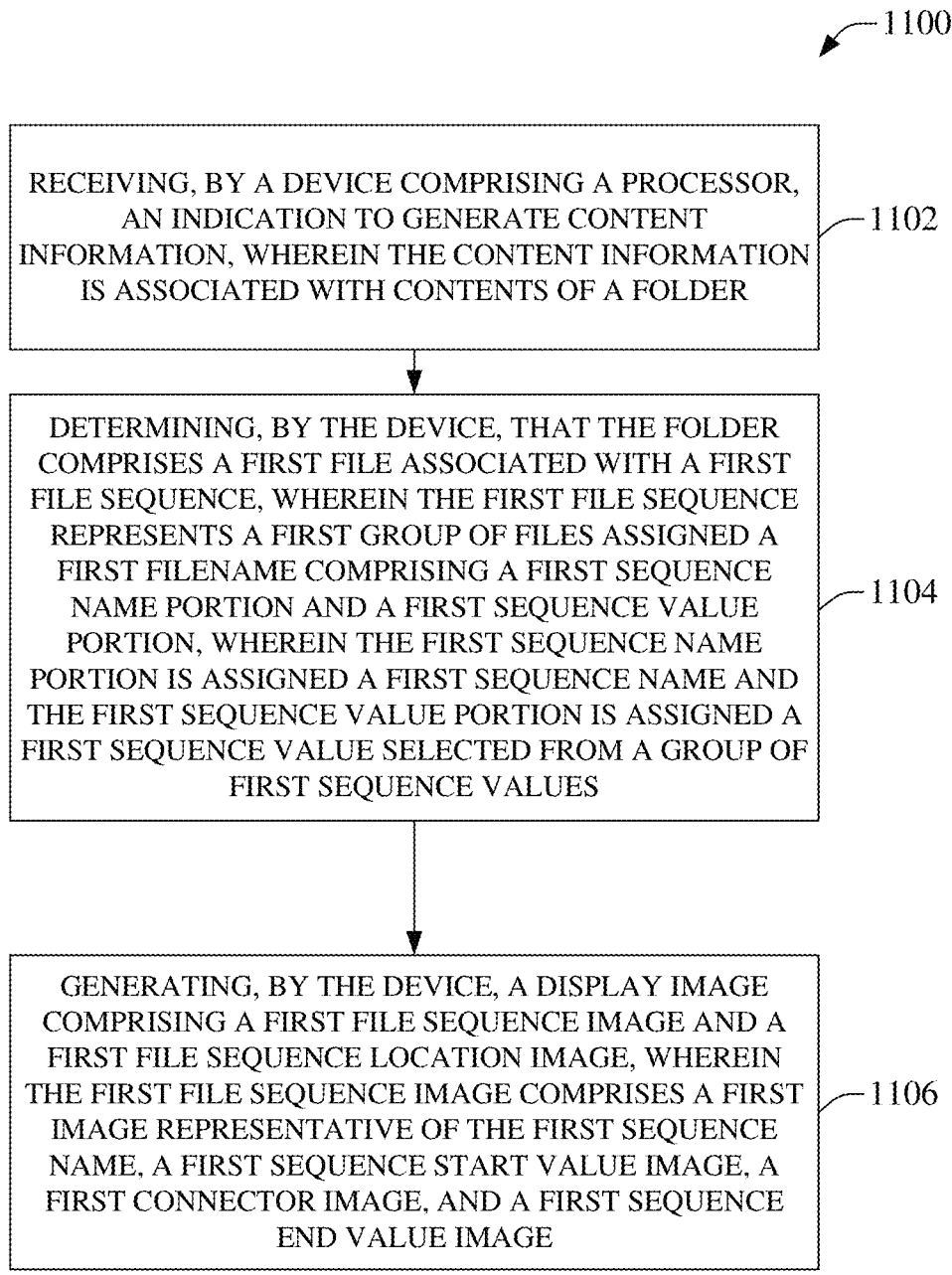
FIG. 11 depicts a diagram of an example, non-limiting computer implemented method that facilitates displaying a sequence and files associated with the sequence that are stored in multiple folders.

FIG. 11 depicts a diagram of an example, non-limiting computer implemented method that facilitates displaying a sequence and files associated with the sequence that are stored in multiple folders. Repetitive description of like elements employed in other embodiments described herein is omitted for sake of brevity. In some examples, flow diagram 1100 can be implemented by operating environment 1500 described below. It can be appreciated that the operations of flow diagram 1100 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 11.

Operation 1102 depicts receiving, by a device comprising a processor, an indication to generate content information, wherein the content information is associated with contents of a folder. Operation 1104 depicts determining, by the device, that the folder comprises a first file associated with a first file sequence, wherein the first file sequence represents a first group of files assigned a first filename comprising a first sequence name portion and a first sequence value portion, wherein the first sequence name portion is assigned a first sequence name and the first sequence value portion is assigned a first sequence value selected from a group of first sequence values. Operation 1106 depicts generating, by the device, a display image comprising a first file sequence image and a first file sequence location image, wherein the first file sequence image comprises a first image representative of the first sequence name, a first sequence start value image, a first connector image, and a first sequence end value image.

Figure 12:
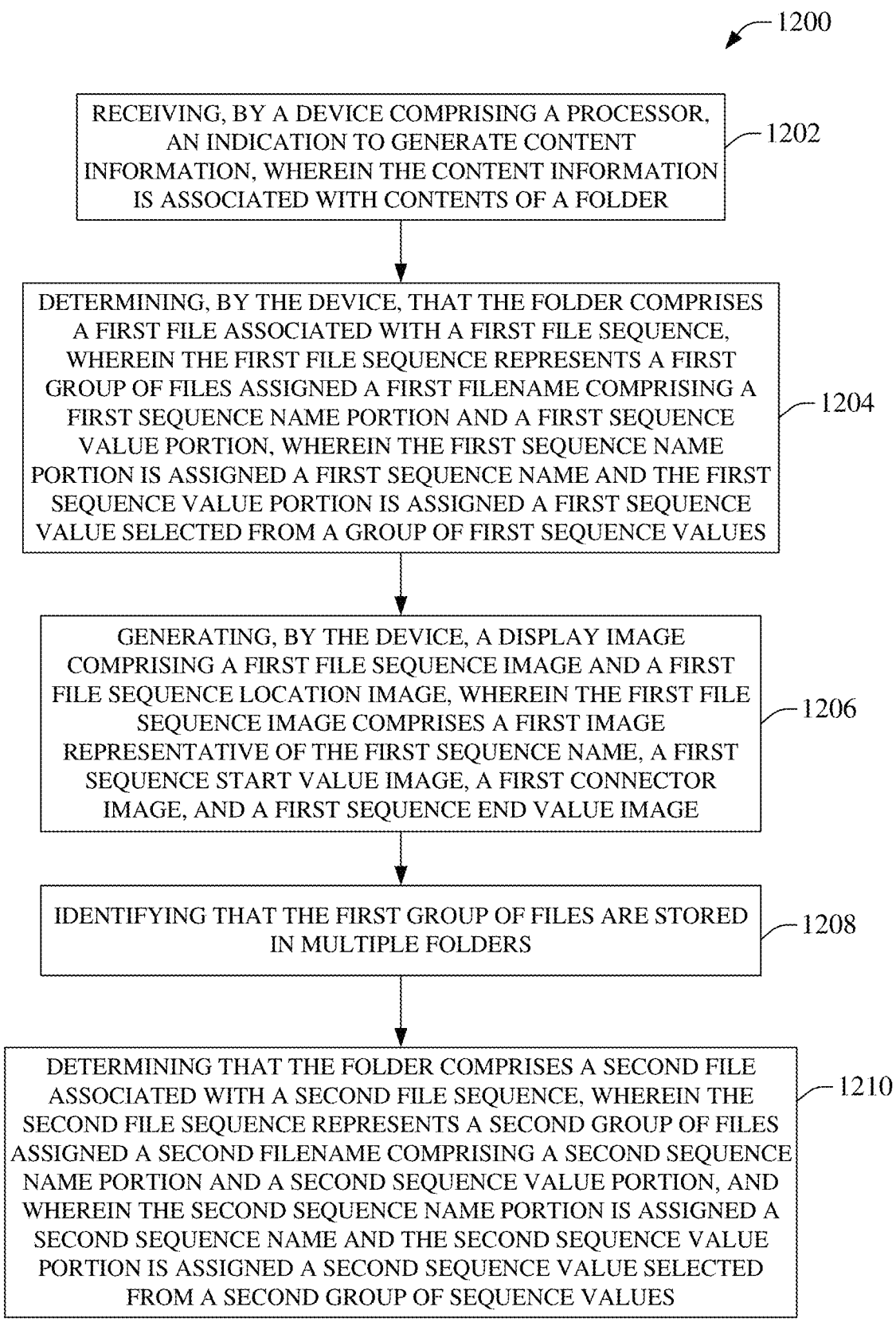
FIG. 12 depicts a diagram of an example, non-limiting computer implemented method that facilitates displaying a sequence and files associated with the sequence that are stored in multiple folders.

FIG. 12 depicts a diagram of an example, non-limiting computer implemented method that facilitates displaying a sequence and files associated with the sequence that are stored in multiple folders. Repetitive description of like elements employed in other embodiments described herein is omitted for sake of brevity. In some examples, flow diagram 1200 can be implemented by operating environment 1500 described below. It can be appreciated that the operations of flow diagram 1200 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 12.

Operation 1202 depicts receiving, by a device comprising a processor, an indication to generate content information, wherein the content information is associated with contents of a folder. Operation 1204 depicts determining, by the device, that the folder comprises a first file associated with a first file sequence, wherein the first file sequence represents a first group of files assigned a first filename comprising a first sequence name portion and a first sequence value portion, wherein the first sequence name portion is assigned a first sequence name and the first sequence value portion is assigned a first sequence value selected from a group of first sequence values. Operation 1206 depicts generating, by the device, a display image comprising a first file sequence image and a first file sequence location image, wherein the first file sequence image comprises a first image representative of the first sequence name, a first sequence start value image, a first connector image, and a first sequence end value image. Operation 1208 depicts identifying that the first group of files are stored in multiple folders. Operation 1210 depicts determining that the folder comprises a second file associated with a second file sequence, wherein the second file sequence represents a second group of files assigned a second filename comprising a second sequence name portion and a second sequence value portion, and wherein the second sequence name portion is assigned a second sequence name and the second sequence value portion is assigned a second sequence value selected from a second group of sequence values.

Figure 13:
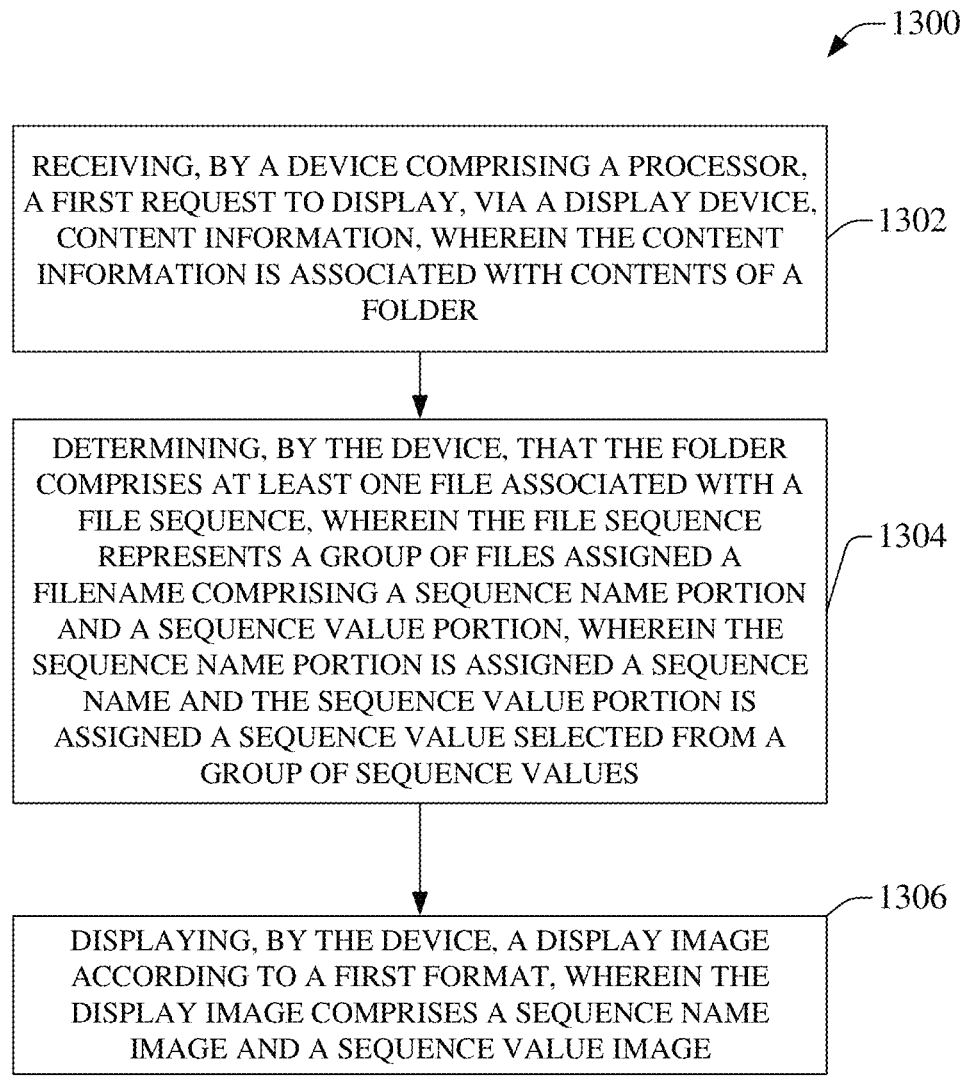
FIG. 13 depicts a diagram of an example, non-limiting computer implemented method that facilitates displaying a sequence and files associated with the sequence having a missing file.

FIG. 13 depicts a diagram of an example, non-limiting computer implemented method that facilitates displaying a sequence and files associated with the sequence having a missing file. Repetitive description of like elements employed in other embodiments described herein is omitted for sake of brevity. In some examples, flow diagram 1300 can be implemented by operating environment 1500 described below. It can be appreciated that the operations of flow diagram 1300 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 13.

Operation 1302 depicts receiving, by a device comprising a processor, a first request to display, via a display device, content information, wherein the content information is associated with contents of a folder. Operation 1304 depicts determining, by the device, that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values. Operation 1306 depicts generating, by the device, a display image according to a first format, wherein the display image comprises a file sequence name image and a file sequence value image, wherein the file sequence name image comprises an image of the file sequence name.

Figure 14:
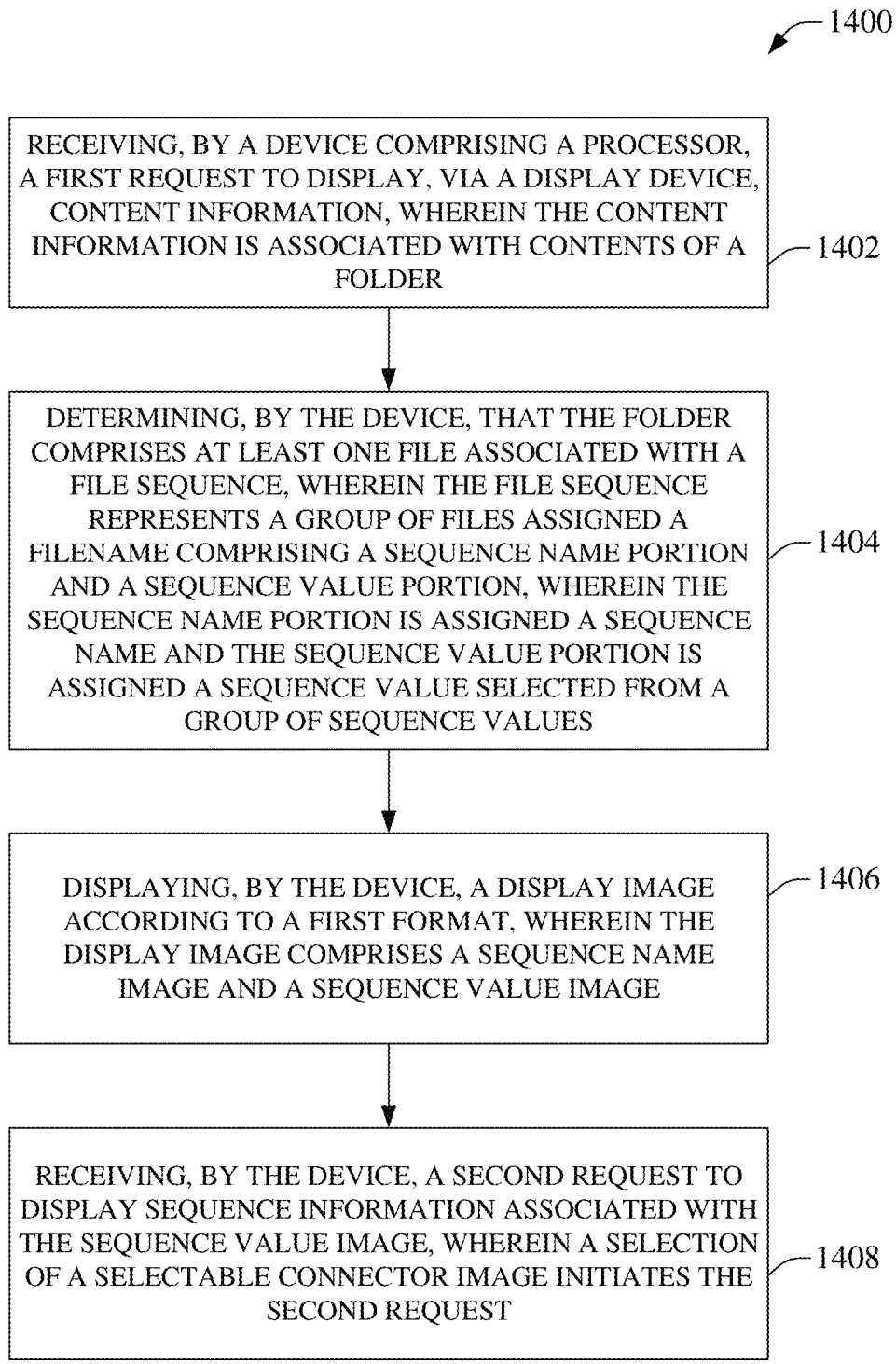
FIG. 14 depicts a diagram of an example, non-limiting computer implemented method that facilitates displaying a sequence and files associated with the sequence having a missing file.

FIG. 14 depicts a diagram of an example, non-limiting computer implemented method that facilitates displaying a sequence and files associated with the sequence having a missing file. Repetitive description of like elements employed in other embodiments described herein is omitted for sake of brevity. In some examples, flow diagram 1400 can be implemented by operating environment 1500 described below. It can be appreciated that the operations of flow diagram 1400 can be implemented in a different order than is depicted.

In non-limiting example embodiments, a computing device (or system) (e.g., computer 1512) is provided, the device or system comprising one or more processors and one or more memories that stores executable instructions that, when executed by the one or more processors, can facilitate performance of the operations as described herein, including the non-limiting methods as illustrated in the flow diagrams of FIG. 14.

Operation 1402 depicts receiving, by a device comprising a processor, a first request to display, via a display device, content information, wherein the content information is associated with contents of a folder. Operation 1404 depicts determining, by the device, that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values. Operation 1406 depicts displaying, by the device, a display image according to a first format, wherein the display image comprises a sequence name image and a sequence value image. Operation 1408 depicts receiving, by the device, a second request to display sequence information associated with the sequence value image, wherein a selection of a selectable connector image initiates the second request.

Figure 15:
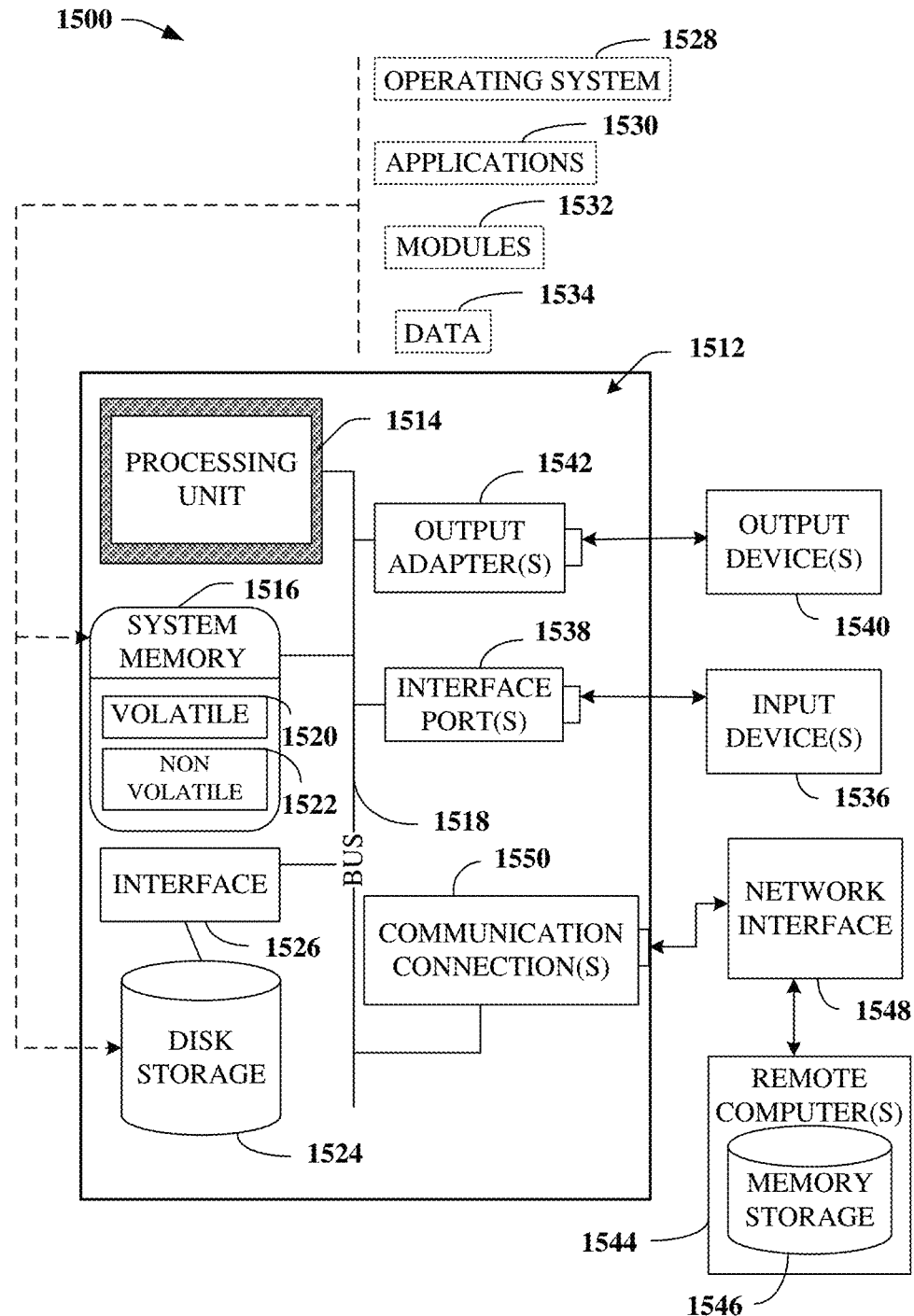
FIG. 15 illustrates a block diagram of an example computer operable to execute mapping of redundant array of independent nodes of a storage device.

FIG. 15 illustrates a block diagram of an example computer operable to execute mapping of redundant array of independent nodes of a storage device. In order to provide additional context for various aspects of the disclosed subject matter, FIG. 15 and the following discussion are intended to provide a brief, general description of a suitable computing environment 1500 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, (e.g., a carrier wave or other transport mechanism), and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference to FIG. 15, a block diagram of a computing system 1500 operable to execute the disclosed systems and methods is illustrated, in accordance with an embodiment. Computer 1512 comprises a processing unit 1514, a system memory 1516, and a system bus 1518. As an example, the component(s), server(s), client(s), node(s), cluster(s), system(s), zone(s), module(s), agent(s), engine(s), manager(s), and/or device(s) disclosed herein with respect to systems 400-900 can each include at least a portion of the computing system 1500. System bus 1518 couples system components comprising, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1516 comprises volatile memory 1520 and nonvolatile memory 1522. A basic input/output system (BIOS), comprising routines to transfer information between elements within computer 1512, such as during start-up, can be stored in nonvolatile memory 1522. By way of illustration, and not limitation, nonvolatile memory 1522 can comprise ROM, PROM, EPROM, EEPROM, or flash memory. Volatile memory 1520 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also comprises removable/non-removable, volatile/non-volatile computer storage media. FIG. 15 illustrates, for example, disk storage 1524. Disk storage 1524 comprises, but is not limited to, devices like a magnetic disk drive, floppy disk drive, tape drive, Jaz drive, Zip drive, LS-100 drive, flash memory card, or memory stick. In addition, disk storage 1524 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

It is to be appreciated that FIG. 15 describes software that acts as an intermediary between users and computer resources described in suitable operating environment 1500. Such software comprises an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be appreciated that the disclosed subject matter can be implemented with various operating systems or combinations of operating systems.

A user can enter commands or information into computer 1512 through input device(s) 1536. Input devices 1536 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1514 through system bus 1518 via interface port(s) 1538. Interface port(s) 1538 comprise, for example, a serial port, a parallel port, a game port, a universal serial bus (USB), a wireless based port, e.g., Wi-Fi, Bluetooth®, etc. Output device(s) 1540 use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540, like display devices, light projection devices, monitors, speakers, and printers, among other output devices 1540, which use special adapters. Output adapters 1542 comprise, by way of illustration and not limitation, video and sound devices, cards, etc. that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, a workstation, a microprocessor based appliance, a peer device, or other common network node and the like, and typically comprises many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically and/or wirelessly connected via communication connection 1550. Network interface 1548 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can comprise, for example, internal and external technologies such as modems, comprising regular telephone grade modems, cable modems and DSL modems, wireless modems, ISDN adapters, and Ethernet cards.

The computer 1512 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1512 can connect to other devices/networks by way of antenna, port, network interface adaptor, wireless access point, modem, and/or the like.

The computer 1512 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth® wireless technologies. Thus, the communication can be a predefined structure as with a conventional network or simply an ad hoc communication between at least two devices.

The computing system 1500 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence-based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to dynamically perform operations as described herein.

A classifier can be a function that maps an input attribute vector, $x=(x1, 8, 9, 10, xn)$, to a confidence that the input belongs to a class, that is, $f(x)$=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence-based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a hardware processor; and
   a memory that stores executable instructions that, when executed by the hardware processor, facilitate performance of operations, comprising:
   receiving a first request to display, via a display device, content information, wherein the content information is associated with contents of a folder;
   determining that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values;
   generating a display image according to a first format, wherein the display image comprises a sequence name image and a sequence value image comprising a sequence start value image, a selectable connector image, and a sequence end value image; and
   displaying a dialog box comprising a first option representing an operation applied to the group of files, a second option representing the operation applied to the at least one file, and a third option representing the operation applied to a collection of files of the group of files, wherein the dialog box facilitates a selection, via user input, of one of the first option, the second option, or the third option, wherein the display box is associated with an alert representing a sound notification that the group of files, the at least one file, and the collection of files are representative of the file sequence, and wherein the operation represents a delete operation that, in response to execution of the delete operation, initiates an asynchronous replication process to synchronize a first storage node of a cluster of storage nodes with the cluster of storage nodes, and wherein the first storage node is situated in a disparate geographical location from a second storage node of the cluster of storage nodes.

2. The system of claim 1, wherein the sequence name image comprises an image representative of the sequence name.

3. The system of claim 1, wherein the group of files comprises a sequence start file and a sequence end file.

4. The system of claim 3, wherein the sequence start value image represents the sequence value assigned to the filename of the sequence start file and the sequence end value image represents the sequence value assigned to the filename of the sequence end file.

5. The system of claim 1, wherein the operations further comprise:
   receiving a second request to display sequence information associated with the sequence value image, wherein a selection of the selectable connector image initiates the second request.

6. The system of claim 5, wherein the operations further comprise:
   generating a sequence number string comprising a list of sequence values.

7. The system of claim 6, wherein the sequence value image is a first sequence value image, wherein the display image is a first display image, and wherein the operations further comprise:
   generating a second display image according to a second format, wherein the second display image comprises the sequence name image and a second sequence value image.

8. The system of claim 7, wherein the operations further comprise:
   displaying, via the display device, the first display image.

9. The system of claim 7, wherein the operations further comprise:
   displaying, via the display device, the second display image, wherein the second sequence value image represents an image of the sequence number string.

10. A method, comprising:
    receiving, by a device comprising a processor, a first request to display, via a display device, content information, wherein the content information is associated with contents of a folder;
    determining, by the device, that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values;
    displaying, by the device, a display image according to a first format, wherein the display image comprises a sequence name image and a sequence value image comprising a sequence start value image, a selectable connector image, and a sequence end value image; and
    facilitating, by the device, display of a dialog box comprising a first option representing an operation applied to the group of files, a second option representing the operation applied to the at least one file, and a third option representing the operation applied to a grouping of files of the group of files, wherein the dialog box facilitates user input that selects one of the first option, the second option, or the third option, wherein the display box is associated with an alert representing a visual notification that the group of files, the at least one file, and the collection of files are representative of the file sequence, and wherein the operation represents a move operation, that in response to execution of the move operation, initiates an asynchronous replication process to synchronize a first storage node of a cluster of storage nodes with the cluster of storage nodes, and wherein the first storage node is situated in a disparate geographical location from a second storage node of the cluster of storage nodes.

11. The method of claim 10, wherein the sequence name image comprises an image representative of the sequence name.

12. The method of claim 10,
wherein the group of files comprises a sequence start file and a sequence end file.

13. The method of claim 12, wherein the sequence start value image represents the sequence value assigned to the filename of the sequence start file and the sequence end value image represents the sequence value assigned to the filename of the sequence end file.

14. The method of claim 10, further comprising:
receiving, by the device, a second request to display sequence information associated with the sequence value image, wherein a selection of a selectable connector image initiates the second request.

15. A non-transitory machine-readable medium, comprising executable instructions that, when executed by a processor, facilitate performance of operations, comprising:
receiving a first request to display, via a display device, content information, wherein the content information is associated with contents of a folder;
identifying that the folder comprises at least one file associated with a file sequence, wherein the file sequence represents a group of files assigned a filename comprising a sequence name portion and a sequence value portion, wherein the sequence name portion is assigned a sequence name and the sequence value portion is assigned a sequence value selected from a group of sequence values;
rendering a display image via the display device according to a first format, wherein the display image comprises a sequence name image and a sequence value image comprising a sequence start value image, a selectable connector image, and a sequence end value image; and
rendering a dialog box comprising a first option representing a move operation applied to the group of files, a second option representing the move operation applied to the at least one file, and a third option representing the move operation applied to a collection of files of the group of files, wherein the dialog box facilitates a selection, by a user entity, of one of the first option, the second option, and the third option, wherein the display box is associated with an alert representing a sound notification and a visual notification that the group of files, the at least one file, and the collection of files are representative of the file sequence, and wherein in response to execution of the move operation, an asynchronous replication process is initiated to synchronize a first storage node of a cluster of storage nodes with the cluster of storage nodes, and wherein the first storage node is situated in a disparate geographical location from a second storage node of the cluster of storage nodes.

16. The non-transitory machine-readable medium of claim 15, wherein the sequence name image comprises an image representative of the sequence name.

17. The non-transitory machine-readable medium of claim 15,
wherein the group of files comprise a sequence start file and a sequence end file; and
wherein the sequence start value image represents the sequence value assigned to the filename of the sequence start file and the sequence end value image represents the sequence value assigned to the filename of the sequence end file.

18. The non-transitory machine-readable medium of claim 17, wherein the operations further comprise:
receiving a second request to display sequence information associated with the sequence value image, wherein a selection of the selectable connector image initiates the second request; and
generating a sequence string comprising a list of sequence values.

19. The non-transitory machine-readable medium of claim 18, wherein the sequence value image is a first sequence value image, wherein the display image is a first display image, and wherein the operations further comprise:
generating a second display image according to a second format, wherein the second display image comprises the sequence name image and a second sequence value image;
displaying, via the display device, the first display image; and
displaying, via the display device, the second display image, wherein the second sequence value image represents an image of the sequence string.

20. The non-transitory machine readable medium of claim 15, wherein the operations further comprise displaying a hierarchical structure of a grouping of omitted files as a function of respective storage locations of members of the grouping of omitted files.

* * * * *